(12) United States Patent
Jose et al.

(10) Patent No.: US 12,099,378 B2
(45) Date of Patent: Sep. 24, 2024

(54) COMPUTER PROCESSING UNIT INTRA-FRAME CLOCK AND VOLTAGE SCALING BASED ON GRAPHICS APPLICATION AWARENESS

(71) Applicant: QUALCOMM Incorporated, San Diego, CA (US)

(72) Inventors: Edwin Jose, San Diego, CA (US); Ravi Jenkal, San Diego, CA (US); Donghyun Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/963,129

(22) Filed: Oct. 10, 2022

(65) Prior Publication Data
US 2023/0118950 A1    Apr. 20, 2023

Related U.S. Application Data

(63) Continuation of application No. 16/804,045, filed on Feb. 28, 2020, now Pat. No. 11,467,621.

(51) Int. Cl.
*G06F 1/08* (2006.01)
*G06F 1/3206* (2019.01)
*G06F 9/38* (2018.01)
*G06F 9/48* (2006.01)

(52) U.S. Cl.
CPC .............. *G06F 1/08* (2013.01); *G06F 1/3206* (2013.01); *G06F 9/3877* (2013.01); *G06F 9/4837* (2013.01); *G06F 9/4843* (2013.01)

(58) Field of Classification Search
CPC ........ G06F 1/08; G06F 1/3206; G06F 1/3296; G06F 1/324; G06F 9/3877; G06F 9/4837; G06F 9/4843
See application file for complete search history.

(56) References Cited

U.S. PATENT DOCUMENTS

| | | |
|---|---|---|
| 2007/0206018 A1 | 9/2007 | Bajic et al. |
| 2008/0079732 A1 | 4/2008 | Park et al. |
| 2009/0309885 A1* | 12/2009 | Samson ................ G09G 5/001 345/519 |
| 2011/0157191 A1 | 6/2011 | Huang et al. |
| 2014/0152678 A1 | 6/2014 | Sharma |

(Continued)

*Primary Examiner* — Raymond N Phan
(74) *Attorney, Agent, or Firm* — QUALCOMM Incorporated

(57) ABSTRACT

Computer processing unit intra-frame clock and voltage scaling based on graphics application awareness is disclosed. The computer processing unit includes a processor configured to execute a graphics application to generate a graphics image for output to a display. The computer processing unit includes a power management circuit configured to perform clock and voltage scaling (CVS) (i.e., frequency and/or voltage scaling) for the processor. The power management circuit is configured to identify a graphics application dispatched to be executed or being executed by the processor and to set the operating point for the processor based on the identified graphics application. This may allow the processor to operate at a more optimal operating point for performance of graphics and non-graphics applications as opposed to operating each application at a lower operating point due to a graphics application that is more current intensive.

15 Claims, 13 Drawing Sheets

(56) References Cited

U.S. PATENT DOCUMENTS

| | | |
|---|---|---|
| 2014/0184619 A1 | 7/2014 | Kim |
| 2015/0015589 A1 | 1/2015 | Chung et al. |
| 2015/0074435 A1 | 3/2015 | Jane et al. |
| 2015/0130821 A1* | 5/2015 | Shah .................. G06F 3/14 345/520 |
| 2015/0317762 A1* | 11/2015 | Park .................. G06F 1/3296 345/505 |
| 2017/0220062 A1* | 8/2017 | Shen .................. G06F 1/324 |
| 2018/0300838 A1* | 10/2018 | Park .................. G06F 3/14 |
| 2020/0211149 A1 | 7/2020 | Sigatapu |
| 2021/0271287 A1 | 9/2021 | Jose et al. |

* cited by examiner

COMPUTER PROCESSING UNIT INTRA-FRAME CLOCK AND VOLTAGE SCALING BASED ON GRAPHICS APPLICATION AWARENESS

CROSS REFERENCE

The present application is a continuation of U.S. patent application Ser. No. 16/804,045, file Feb. 28, 2020 which is assigned to the assignee hereof, and expressly incorporated by reference herein.

I. FIELD OF THE DISCLOSURE

The technology of the disclosure relates generally to computer processing units that perform graphics processing, such as central processing units (CPUs) and graphic processing units (GPUs), and more particularly to power management of such computer processing units.

II. BACKGROUND

One type of computer processing unit is a graphics processing unit (GPU). A GPU is a specialized electronic circuit designed to rapidly manipulate and alter memory to accelerate the creation of images in a frame buffer intended for output to a display. GPUs are used in embedded systems, mobile phones, personal computers, workstations, and game consoles as examples. GPUs employ a highly parallel architecture and structure that makes them more efficient than general purpose central processing units (CPUs) for processing algorithms that process large blocks of data in parallel.

GPUs use a mode called "tile rendering" or "bin based rendering" for three-dimensional (3D) graphics image rendering. The tile rendering mode subdivides an image that is being drawn into a number of smaller bins. The CPU determines which triangles are visible in each bin, and then renders each bin in succession, using fast on-chip memory in the GPU to hold the portion of the image inside the bin. Once the bin has been rendered, the on-chip is copied out to its proper location into system memory for outputting to a display, and the next bin is rendered. Tile-based image rendering can be further divided in three passes: the bin visibility pass; the rendering pass(es); and the resolve pass(es). The purpose of the bin visibility pass is to determine which triangles contribute fragments to each of the bins or tiles. The result of the bin visibility pass is a visibility stream that contains a bit for each triangle that was checked, indicating whether the triangle was visible in a given bin. The visibility stream is compressed and written into the system memory. The GPU also performs a rendering pass for each bin to draw the portion of the image located inside the bin. Triangles that are not culled by the visibility stream check are rendered in this pass. Actual pixel rasterization and shading is done in the rendering pass. The GPU also performs a resolve pass for each bin to copy the portion of the image contained in the current bin out to the system memory. After the rendering of a bin is complete, color content of the rendered bin is resolved into the system memory before proceeding to the next bin.

Conventional GPUs employ dynamic clock and voltage scaling (DCVS) to manage and conserve power usage. A GPU can employ a power management circuit to perform DCVS by determining the optimal operating point for the GPU core processor(s) in terms of clock frequency and operating voltage used to operate the GPU. The power management circuit may communicate a new operating voltage to a power management integrated circuit (IC) (PMIC) that controls the operating voltage supplied to the GPU. The power management circuit can employ hardware circuits, firmware, and/or a software mechanism to change the operating point for the GPU based on power consumption and application. A latency is incurred between the time a power management circuit determines to change the operating point for the GPU and when the clock frequency and operating voltage transitions to the new operating point. This latency depends on the mechanism employed by the power management circuit to determine the operating point for the GPU. For example, a hardware circuit mechanism may be able to determine and change the operating point in microseconds, whereas a software mechanism may only be able to determine and change the operating point in milliseconds.

GPUs can incur a risk of drawing too much current from a PMIC, which can cause a GPU brown-out due to a PMIC brown-out. If the PMIC is unable to sustain current draw from the GPU beyond the PMIC current draw limits, this can cause a voltage droop in the operating voltage that could cause the GPU to become non-operational and crash. A power management circuit can employ solutions to limit current drawn by the GPU to remain within the current limits of the PMIC. However, there are still instances where the highest operating point that can set by the power management circuit, even taking into consideration current limits of the PMIC, is not sustainable for the PMIC beyond a certain period of time. In this case, a software mechanism can be employed by the power management circuit to further limit the operating point (e.g., by disabling such operating points) based on a monitored current draw from the PMIC. If the monitored current draw exceeds current draw limit, the power management circuit can lower the operating point to lower the current draw even though the PMIC may be capable of supplying a higher current draw under certain conditions. Limiting the operating point for a GPU impacts the speed at which GPU can render a frame, thus degrading completed frame per second (FPS).

SUMMARY OF THE DISCLOSURE

Aspects disclosed herein include computer processing unit intra-frame clock and voltage scaling based on graphics application awareness. The computer processing unit includes a processor that is configured to process graphics applications involving execution of instructions related to graphics operations, such as graphics rendering. For example, a graphics operation can include an operation involved in generating a graphics image rendering for output to a display. For example, the processor can be a central processing unit (CPU) or a graphics processing unit (GPU). The image rendering processing performed by the processor subdivides an image being drawn into a number of smaller bins that are rendered and copied to memory for output to a display. The image rendering processing can include a plurality of image rendering passes that perform different functions, such as a bin visibility pass, a rendering pass, and a resolve pass as examples. An image rendering pass is the flow of data through a computer processing unit pipeline so that the data gets computed to be consumed for the next stage of rendering an image. The computer processing unit includes a power management circuit configured to perform clock and voltage scaling (CVS) by determining and setting an optimal operating point (i.e., frequency and operating voltage) of the processor for performance. The power management circuit is configured to cause a power supply to supply an operating voltage at the determined operating point to the processor for operation.

In exemplary aspects disclosed herein, the power management circuit of the computer processing unit is configured to identify a graphics application dispatched to be executed or being executed by the processor. The power management circuit is configured to adjust the operating point for the processor based on the identified graphics application. The computer processing unit can adjust the operating point for the processor by adjusting the frequency of a clock signal clocking the processor as an example. For example, a graphics application may involve more intense processing than non-graphics applications, such as compute applications. Thus, a graphics application may cause the processor to draw more current than a non-graphics application for a given operating point. If a single operating point is set for the processor without regard to identifying a graphics versus a non-graphics application, the operating point for the processor may have to be set to a lower operating point for both graphics and non-graphics applications alike to avoid risking exceeding current limits of the power supply when executing the graphics application. This can sacrifice performance of the non-graphics application which may be able to operate at a higher operating point without exceeding current limits of the power supply. Thus, in exemplary aspects, the power management circuit is configured to set the operating point for the processor based on identifying a graphics application. For example, the power management circuit may adjust the operating point for the processor higher for non-graphics applications and adjust the operating point lower for graphics applications. Being able to adjust the operating point for the processor based on identifying a graphics application can allow the processor to operate at more optimal operating points for both graphic and non-graphic applications, as opposed to having to operate the processor at the lower operating point for all applications.

As another example, the power management circuit of the computer processing unit can be configured to identify a particular image rendering pass to be or being executed by the processor within a graphics application and adjust the operating point for the processor based on the identified image rendering pass. For example, a visibility/binning pass of a graphics application may involve less processing and be less power intensive, thus causing the processor to draw less current than when the processor is executing a rendering pass and/or the resolve pass of a graphics application. The power management circuit can be configured to set the operating point for the processor higher for the during execution of the bin visibility pass than during execution of the rendering pass and the resolve pass without risking exceeding current limits of the power supply. This allows the processor to operate at a more optimal operating point for performance for each of the image rendering passes as opposed to certain image rendering passes having to operate at a lower operating point due to other image rendering passes having to operate at such lower operating point to avoid exceeding current draw limits.

In this regard, in one exemplary aspect, a computer processing unit is provided. The computer processing unit includes a processor configured to execute a plurality of instructions for an application based on a clock signal of an operating frequency and a power signal at an operating voltage. The computer processing unit also includes a power management circuit configured to receive a command for the application dispatched for execution in the processor, and identify a type of application dispatched for execution in the processor based on the received command. In response to the identified type of application including a graphics application, the power management circuit is configured to determine a first operating point for the processor based on the type of application including the graphics application, and adjust an operating point for the processor based on the determined first operating point.

In another exemplary aspect, a method of scaling clock frequency and operating voltage of a processor is provided. The method includes executing a plurality of instructions for an application based on a clock signal of an operating frequency and a power signal at an operating voltage, receiving a command for the application dispatched for execution in the processor, and identifying a type of application for the command dispatched for execution in the processor. In response to the identified type of application including a graphics application, the method also includes determining a first operating point for the processor based on the type of application including the graphics application, and adjusting an operating point for the processor based on the determined first operating point.

In another exemplary aspect, a non-transitory computer-readable medium is provided. The non-transitory computer-readable medium has stored thereon computer executable instructions which, when executed, cause a processor to receive a plurality of instructions for an application dispatched for execution in the processor, execute the plurality of instructions for the application based on a clock signal of an operating frequency and a power signal at an operating voltage, and identify a type of application dispatched for execution in the processor. In response to the identified type of application including a graphics application, the computer executable instructions which, when executed, cause the processor to determine a first operating point for the processor based on the type of application including the graphics application, and adjust an operating point for the processor based on the determined first operating point.

DETAILED DESCRIPTION

Figure 1:
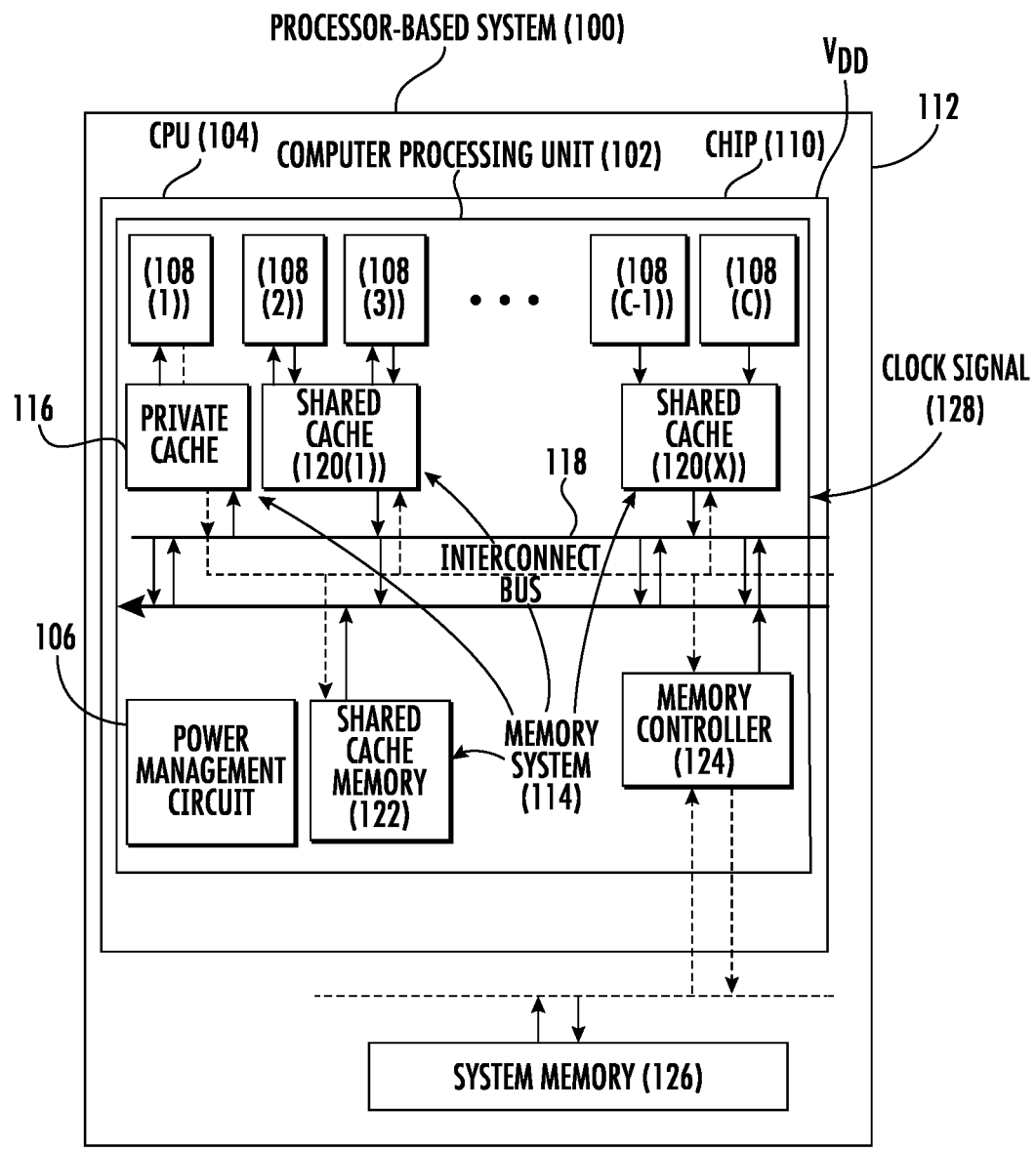
FIG. 1 is a schematic diagram of an exemplary processor-based system that includes a central processing unit (CPU) that includes a plurality of processors.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include computer processing unit intra-frame clock and voltage scaling based on graphic application awareness. The computer processing unit includes a processor that is configured to process graphics applications involving execution of instructions related to graphics operations, such as graphics rendering. For example, a graphics operation can include an operation involved in generating a graphics image rendering for output to a display. For example, the processor can be a central processing unit (CPU) or a graphics processing unit (GPU). The image rendering processing performed by the processor subdivides an image being drawn into a number of smaller bins that are rendered and copied to memory for output to a display. The image rendering processing can include a plurality of image rendering passes that perform different functions, such as a bin visibility pass, a rendering pass, and a resolve pass as examples. An image rendering pass is the flow of data through a computer processing unit pipeline so that the data gets computed to be consumed for the next stage of rendering an image. The computer processing unit includes a power management circuit configured to perform clock and voltage scaling (CVS) by determining and setting an optimal operating point (i.e., frequency and operating voltage) of the processor for performance. The power management circuit is configured to cause a power supply to supply an operating voltage at the determined operating point to the processor for operation.

In exemplary aspects disclosed herein, the power management circuit of the computer processing unit is configured to identify a graphics application dispatched to be executed or being executed by the processor. The power management circuit is configured to adjust the operating point for the processor based on the identified graphics application. The computer processing unit can adjust the operating point for the processor by adjusting the frequency of a clock signal clocking the processor as an example. For example, a graphics application may involve more intense processing than non-graphics applications, such as compute applications. Thus, a graphics application may cause the processor to draw more current than a non-graphics application for a given operating point. If a single operating point is set for the processor without regard to identifying a graphics versus a non-graphics application, the operating point for the processor may have to be set to a lower operating point for both graphics and non-graphics applications alike to avoid risking exceeding current limits of the power supply when executing the graphics application. This can sacrifice performance of the non-graphics application which may be able to operate at a higher operating point without exceeding current limits of the power supply. Thus, in exemplary aspects, the power management circuit is configured to set the operating point for the processor based on identifying a graphics application. For example, the power management circuit may adjust the operating point for the processor higher for non-graphics applications and adjust the operating point lower for graphics applications. Being able to adjust the operating point for the processor based on identifying a graphics application can allow the processor to operate at more optimal operating points for both graphic and non-graphic applications, as opposed to having to operate the processor at the lower operating point for all applications.

Figure 2:
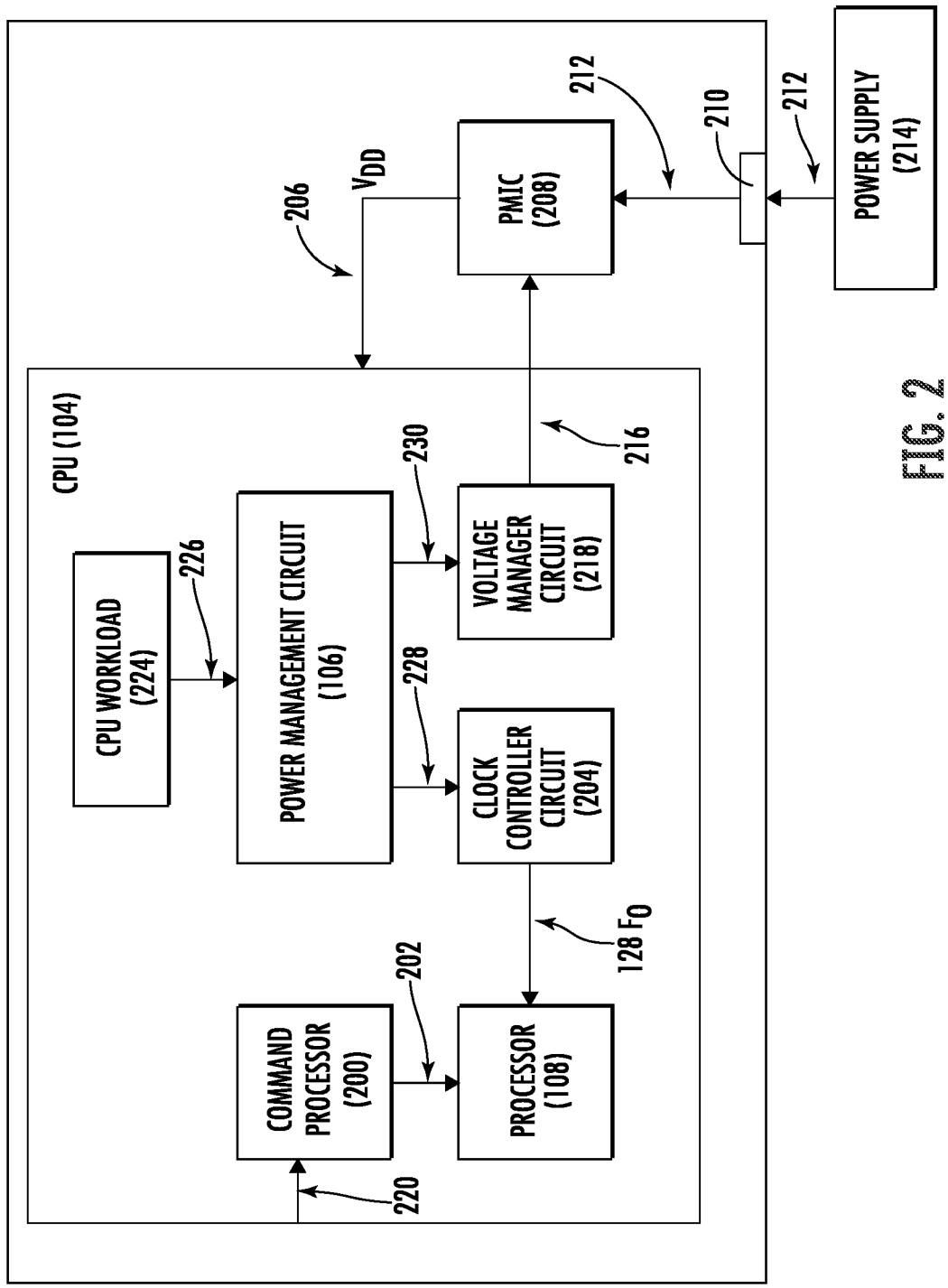
FIG. 2 is a schematic diagram illustrating more exemplary detail of the CPU in FIG. 1 including a power management circuit configured to set an operating point (i.e., frequency and/or voltage) based on a CPU workload for controlling the operating frequency and operating voltage used for operation of the CPU.
Figure 3:
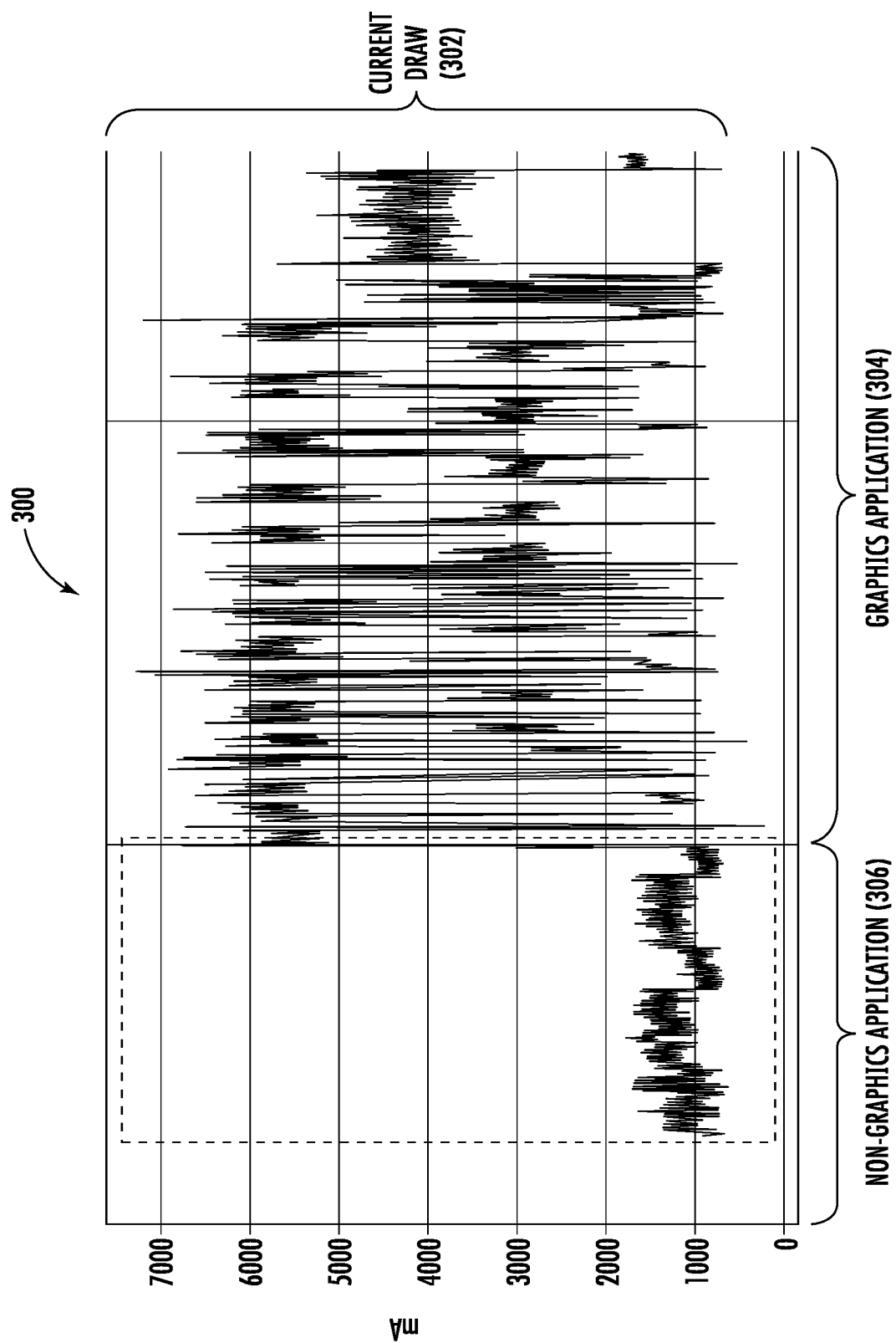
FIG. 3 is a graph illustrating exemplary current draw by the CPU in FIGS. 1 and 2 between a graphics and non-graphics application executing in the CPU.
Figure 4:
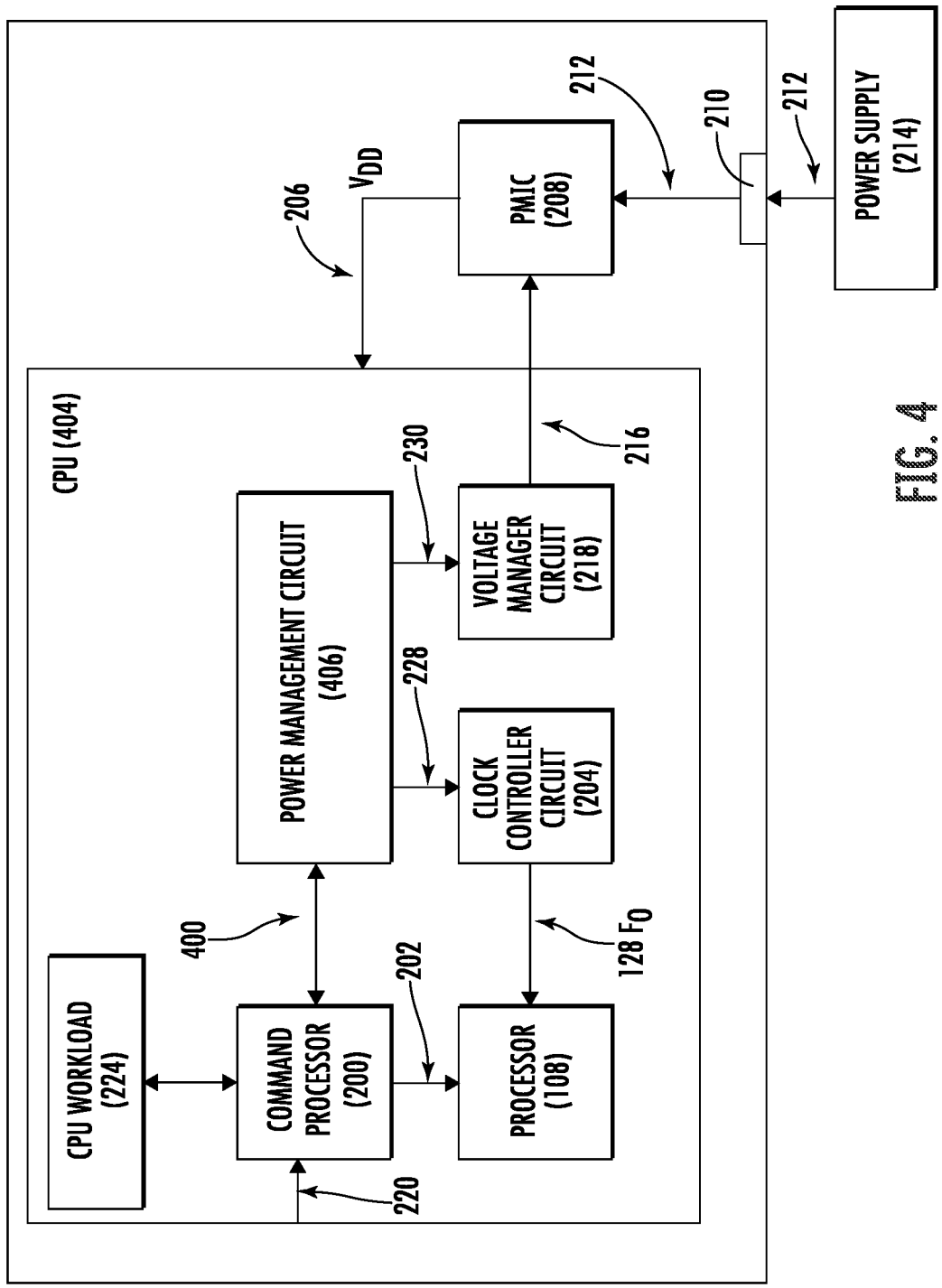
FIG. 4 is a schematic diagram of an exemplary CPU that includes a processor and power management circuit configured to set an operating point (i.e., frequency and/or voltage) to control the operating frequency and/or the operating voltage used for operation of the processor, based on identifying of a graphics application dispatched for execution by the processor.

Before discussing exemplary computer processing units that include a processor and a power management circuit configured to set an operating point (i.e., frequency and/or voltage) for the processor based on the identification of a graphics application starting at FIG. 4, an exemplary computer processing unit that has a power management circuit that does not set an operating point for the processor based on identification of a graphics application is first discussed with regard to FIGS. 1-3.

In this regard, FIG. 1 is a schematic diagram of an exemplary processor-based system 100 that includes a computer processing unit 102. In this example, the computer processing unit 102 is a central processing unit (CPU) 104. As discussed in more detail below, the CPU 104 includes a power management circuit 106 configured to set an operating frequency and operating voltage known as an "operating point" for a processor 108(1)-108(C) for their processing of instructions based on the identified type of application being executed. The CPU 104 is included on a separate semiconductor die or integrated circuit (IC) chip 110 which can be packaged in a multi-chip package 112. The CPU 104 in this example includes a corresponding hierarchal memory system 114 that contains memory components configured to store data and be accessed by requesting a processor 108(1)-108(C) for memory access requests. For example, CPU 104 has a memory system 114 that includes a private local cache memory 116 for CPU 104, which may be a Level 2 (L2) cache memory. Cache misses to the local cache memory 116 are forwarded by an internal interconnect bus 118 to a local shared cache memory 120(1)-120(X) as part of the memory system 114. The internal interconnect bus 118, which may be a coherent bus, allows each of the processors 108(1)-108(C) in the CPU 104 to access the local shared cache memories 120(1)-120(X) and other shared resources coupled to the interconnect bus 118. Cache misses to the local shared cache memory 120(1)-120(X) are forwarded on the interconnect bus 118 to a next level shared cache memory 122 (e.g., a Level 3 (L3) cache memory) as part of the memory system 114 in the CPU 104. If a memory read request requested by a processor 108(1)-108(C) further results in a cache miss to the shared cache memory 122, the memory read request is forwarded by the interconnect bus 118 to a memory controller 124 that is communicatively coupled to a system memory 126 as a main memory in the processor-based system 100. The system memory 126 can be external to the CPU 104 as shown in FIG. 1, or could also be internal to the CPU 104, such as a last level cache memory, for example.

The CPU 104 in FIG. 1 may be designed to not only execute instructions for compute applications for performing computing operations, but may also be designed to execute graphics applications to generate images to be displayed to an output device. For example, the processor-based system 100 in FIG. 1 could include a video interface, such as a video processor, that is configured to interface with the CPU 104 to display generated images to a display. Graphics applications may be more memory intensive and access memory off a processor 108(1)-108(C) more frequently than non-graphics applications, such as compute applications that involve general computational operations through access to registers and/or memory. In graphics applications, a generated image consists of generating a large number of pixels in a frame buffer in memory. For example, the processors 108(1)-108(C) in the CPU 104 in FIG. 1 may heavily access the system memory 126 to store generated images, which has a higher access latency than the cache memories in the memory system 114 and which may be more frequently used for memory in non-graphic applications, such as compute applications.

The CPU 104 in FIG. 1 requires a clock signal 128 to coordinate timing of logic in the processors 108(1)-108(C) and other circuits. The frequency of the clock signal 128 controls a switching speed or rate of the logic, and thus the performance of the CPU 104. A relationship exists between a clock frequency of the CPU 104 and a voltage level of an operating voltage $V_{DD}$ powering the CPU 104. An increase in the clock frequency of the clock signal 128 causes a corresponding increase in a minimum voltage level required to power the CPU 104 for proper operation. Accordingly, an increase in clock frequency of the clock signal 128 generally results in increased power consumption. Power consumption of the CPU 104 can be decreased by lowering the operating voltage $V_{DD}$. However, a reduction in operating voltage $V_{DD}$ decreases the maximum clock frequency of the clock signal 128 possible to operate the CPU 104. The operating voltage $V_{DD}$ can be reduced until a minimum threshold voltage level necessary for proper operation of the CPU 104 at a desired clock frequency of the clock signal 128.

To optimize power consumption of the CPU 104 in FIG. 1 while still providing acceptable performance, the CPU 104 includes the power management circuit 106. The power management circuit 106 in the CPU 104 in FIG. 1 is configured to provide dynamic clock and voltage scaling (DCVS) of the CPU 104 as a power savings technique. The power management circuit 106 controls clock frequency of the clock signal 128 and voltage level settings of the operating voltage $V_{DD}$ by predicting optimal clock frequency and voltage settings for the CPU 104 based on performance demands (i.e., workload) of the CPU 104. In this manner, the power management circuit 106 may optimize power consumption of the CPU 104 required for a demanded performance level. The power management circuit 106 is configured to set the operating point according to a DCVS algorithm to achieve optimal performance, but without exceeding the current draw limits of a power supply or other power integrated circuit (IC) that is tasked with supplying power to the CPU 104. For example, the higher the operating frequency of the clock signal 128 clocking the CPU 104, the higher the operating voltage $V_{DD}$ may be required to sustain performance at such operating frequency. A higher operating voltage $V_{DD}$ can result in a higher current draw by the CPU 104 on a power supply.

FIG. 2 is a schematic diagram illustrating more exemplary detail of the CPU 104 in FIG. 1 that includes the power management circuit 106 configured to set an operating point (i.e., frequency and/or voltage) for controlling the operating frequency and operating voltage used for operation of the CPU 104. As shown in FIG. 2, one processor 108 of the CPU 104 is shown. However, note that as shown in FIG. 1, the CPU 104 may include multiple processors 108(1)-108(C). The CPU 104 includes a command processor 200 that is configured to issue a command 202 to dispatch an application to the processor 108 for execution. The processor 108 is configured to execute instructions of the dispatched application based on being clocked by the clock signal 128 at its operating frequency $F_O$ generated by a clock controller circuit 204 and an operating voltage $V_{DD}$ of a power signal 206 regulated by a power management integrated circuit (IC) (PMIC) 208. The PMIC 208 may be a separate chip that is located on or off-board with the CPU 104. Alternatively, the PMIC 208 may be integrated into the same chip as the CPU 104. The PMIC 208 is coupled to a power interface 210 to receive a power signal 212 from a power supply 214, such as a battery for example. The PMIC 208 is configured to regulate the operating voltage $V_{DD}$ of the generated power signal 206 supplied to the CPU 104 for operating based on a voltage setting signal 216 issued by a voltage manager circuit 218.

With continuing reference to FIG. 2, the command processor 200 issues the instructions 220 to the processor 108 to be executed. For example, the command processor 200 may be a front end circuit of an instruction processing circuit that is configured to fetch and decode the instructions 220. The command processor 200 is also configured to receive a CPU workload 224 from a software kernel (e.g., an operating system (OS) kernel) indicative of the workload executing on CPU 104. The command processor 200 is configured to communicate the CPU workload 224 indicative of the workload on the CPU 104 to the power management circuit 106, such as through inter-process communications (IPC). The power management circuit 106 is then configured to set the operating point for the CPU 104 based on the CPU workload 224 in terms controlling the operating frequency $F_O$ of the clock signal 128 and controlling the operating voltage $V_{DD}$ of the power signal 206 from the PMIC 208. In this regard, the power management circuit 106 is configured receive a command 226 indicative of the CPU workload 224 being executed in CPU 104. The power management circuit 106 is configured to determine the optimal operating frequency $F_O$ of the clock signal 128 and an operating voltage $V_{DD}$ of the power signal 206 based on the CPU workload 224. The power management circuit 106 is then configured to issue a frequency command 228 to the clock controller circuit 204 comprising a clock frequency to set the operating frequency $F_O$ of the clock signal 128 generated by the clock controller circuit 204 based on the determined operating point for the CPU 104. The power management circuit 106 is also configured to issue a voltage command 230 to the voltage manager circuit 218 comprising a voltage level to set the operating voltage $V_{DD}$ of the power signal 206 regulated by the PMIC 208 based on the determined operating point for the CPU 104.

For example, FIG. 3 is a graph 300 illustrating exemplary current draw 302 by the CPU 104 in FIGS. 1 and 2 when executing a non-graphics applications and a graphics application based on an operating point set by the power management circuit 106 according to a DCVS algorithm. The graph 300 in FIG. 3 is based on the power management circuit 106 having set a specific operating point for the CPU 104. As seen from FIG. 3, the current draw 302 is much higher when the CPU 104 is executing a graphics application 304 than when executing a non-graphics application 306 in this example. The power management circuit 106 sets a specific operating point for operating of the CPU 104 based on the higher operational intensity and thus current demand of the graphics application 304 so that the current draw of the power supply supplying the operating voltage $V_{DD}$ will not be exceeded and to avoid a voltage droop. However, this means that the operating point for the CPU 104 results in a lower current draw for the non-graphics application 306 being a less operationally intensive application as shown in FIG. 3. In other words, the operating point for the CPU 104 is lower than it could be and still does not risk exceeding current draw limits of the power supply when the CPU 104 is executing the non-graphics application 306. This creates performance degradation of the CPU 104 when executing the non-graphics application 306.

In this regard, FIG. 4 is a schematic diagram of an exemplary CPU 404 that could be included in the processor-based system 100 in FIG. 1. The CPU 404 includes a power management circuit 406 configured to set an operating point (i.e., frequency and/or voltage) to control the operating frequency and/or the operating voltage used for operation of the CPU 404 based on identifying of a graphics application dispatched for execution by the CPU 404. As discussed below, this allows the operating point for the CPU 404 to be changed based on whether a graphics or a non-graphics application is dispatched for execution. Using the example in FIG. 3, this means that an operating point for the CPU 404 could be increased when executing the non-graphics application 306 and not risk exceeding current draw limits of the power supply 214 supplying to the CPU 404. But then when the graphics application 304 is dispatched to be executed, the power management circuit 406 can adjust the operating point for the CPU 404 lower to not risk exceeding current draw of the power supply 214. Common components between the CPU 104 in FIG. 1 and the CPU 404 in FIG. 4 are shown with the same element numbers between FIGS. 1 and 4 and are not re-described.

Figure 5:
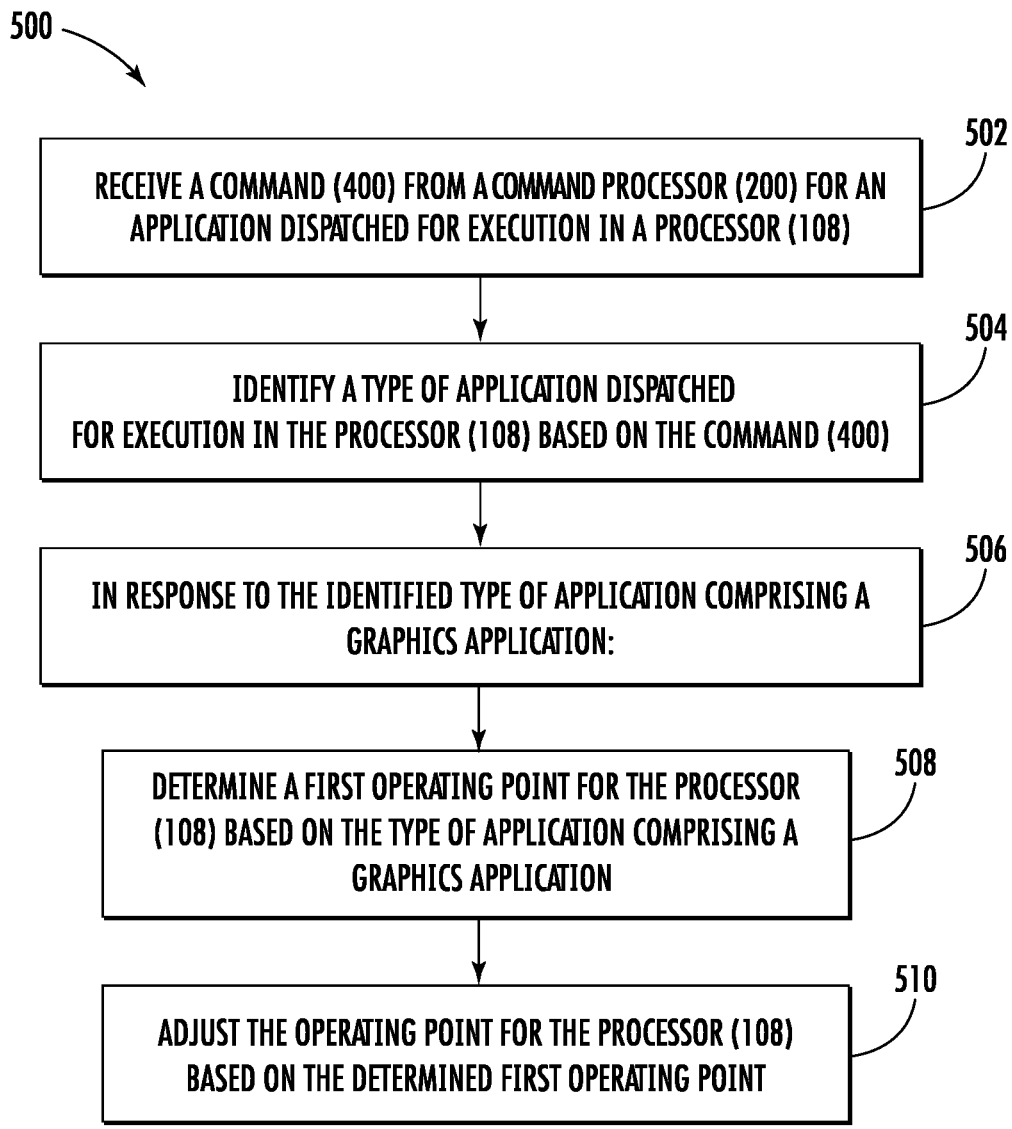
FIG. 5 is a flowchart illustrating an exemplary process of the power management circuit in FIG. 4 setting an operating point for the processor based on the identification of a graphics application dispatched for execution by the processor.

With reference to FIG. 4, the operation of the CPU 404 and the power management circuit 406 for setting an operating point for the processor 108 based on the identification of a graphics application dispatched for execution by the CPU 404 is discussed in conjunction with the flowchart in FIG. 5. In this regard, the power management circuit 406 is configured to receive a command 400 from the command processor 200 in this example for the application dispatched for execution in the processor 108 (block 502 in FIG. 5). The power management circuit 406 is configured to identify the type of application dispatched for execution in the processor 108 based on the command 400 received from the command processor 200 (block 504 in FIG. 5). If the type of application dispatched for execution in the processor 108 is a graphics application (block 506 in FIG. 5), the power management circuit 406 is configured to determine a first operating point for the processor 108 based on a graphics application being dispatched for execution to the processor 108 (block 508 in FIG. 5). The power management circuit 406 is then configured to adjust the operating point for the processor 108 based on the determined first operating point (block 510 in FIG. 5).

Note that the command processor 200 can be configured to issue the command 400 directly or indirectly to the power management circuit 406. For example, the command processor 200 could send an IPC message for the command 400 to the power management circuit 406. Alternatively, the command processor 200 could use an interrupt to communicate the command 400 to the power management circuit 406. The command processor 200 could be configured to store a message with the command 400 to a designated memory location in memory, like a cache memory in the memory system 114 in FIG. 1, and then generate an interrupt for the power management circuit 406. The power management circuit 406 could then be configured to consult the designated memory location in response to the interrupt as part of its interrupt handling to retrieve the information in the command to use to determine if the operating point is to be adjusted.

In this example of DCVS, the power management circuit 406 is configured to adjust the operating point by issuing the frequency command 228 to the clock controller circuit 204 indicating the desired operating frequency $F_O$ of the determined operating point. The power management circuit 406 is also configured to issue the voltage command 230 to the voltage manager circuit 218 to indicate the desired voltage level for the operating voltage $V_{DD}$ of the determined first operating point. If the type of application dispatched for execution in the processor 108 is a non-graphics application, the power management circuit 406 is configured to determine a second operating point for the processor 108 based on a non-graphics application being dispatched for execution to the processor 108. The power management circuit 406 is then configured to adjust the operating point for the processor 108 based on the determined second operating point.

The power management circuit 406 could be configured to set a plurality of different operating points for both graphics and non-graphics applications rather than just one operating point. The power management circuit 406 can be configured set the first operating point for a graphics application lower than the second operating point for a non-graphics application, or vice versa. For example, the power management circuit 406 can be configured to set an operating point for a non-graphics application for a higher operating frequency $F_O$ and/or higher operating voltage $V_{DD}$ than for a graphics application. Alternatively, the power management circuit 406 could be configured to set an operating point for a graphics application for a higher operating frequency $F_O$ and/or higher operating voltage $V_{DD}$ than for a non-graphics application if the non-graphics application is more processing intensive and has a higher current draw than a graphics application as an example.

Note that the power management circuit 406 could alternatively be configured to implement dynamic frequency scaling (DFS) where only the operating frequency $F_O$ of the clock signal 128 is adjusted. Also note that the power management circuit 406 could alternatively be configured to implement dynamic voltage scaling (DVS) where only the operating voltage $V_{DD}$ of the power signal 206 is adjusted. Also note that the power management circuit 406 could be configured to adjust the operating voltage $V_{DD}$ as part of an increase to the operating point of the CPU 404 gradually to allow the PMIC 208 to regulate the operating voltage $V_{DD}$ of the power signal 206 over time to avoid voltage spikes that can cause in-rush currents due to spikes in current demand. In this regard, the power management circuit 406 could be configured to first adjust the operating voltage $V_{DD}$ of the power signal 206 in response to a voltage command 230 to a first operating voltage $V_{DD}$ and then after a certain period of time, further adjust the operating voltage $V_{DD}$ of the power signal 206 in response to a voltage command 230 to a second or final operating voltage $V_{DD}$ according to the determined operating point.

Figure 6:
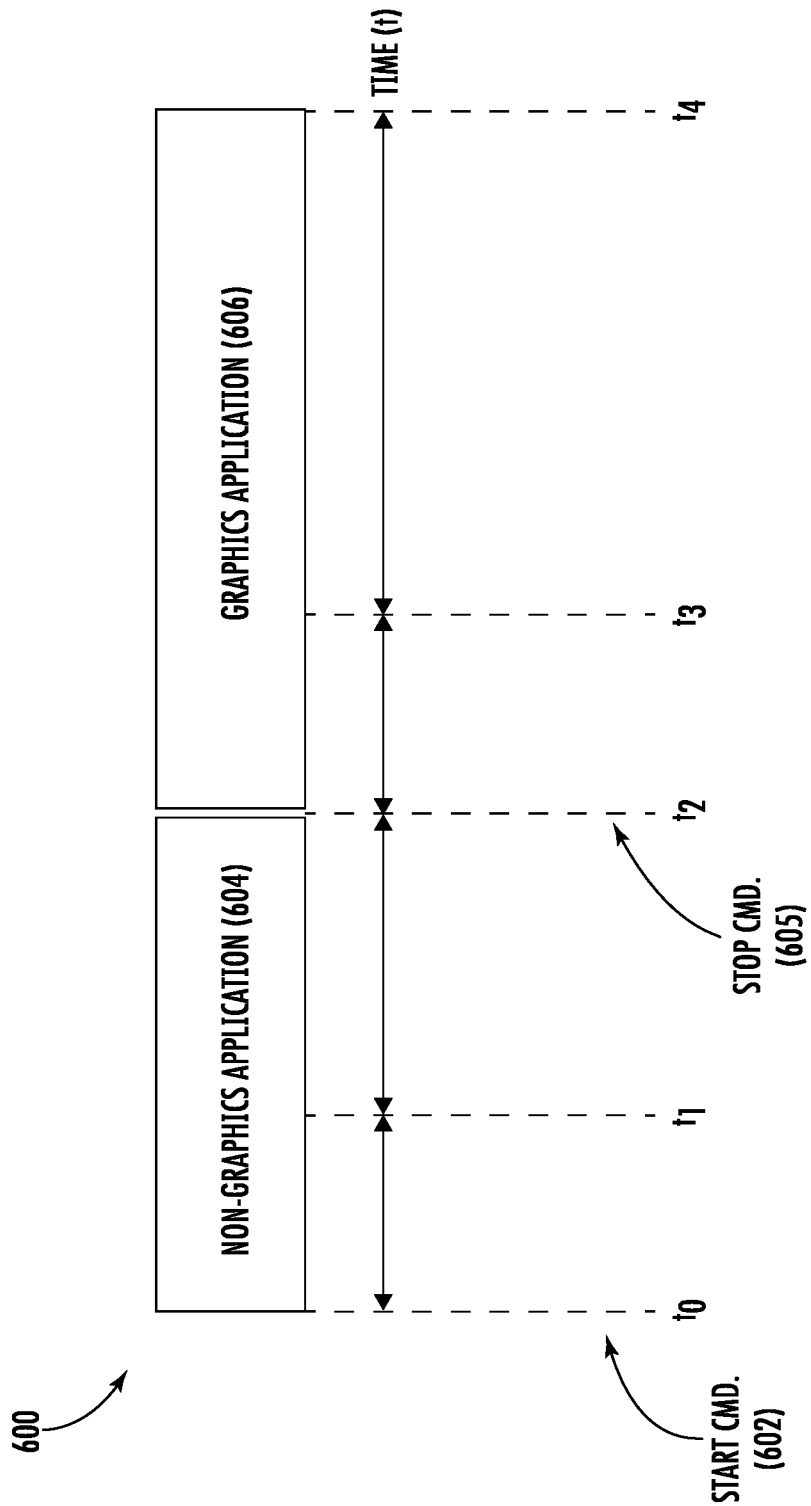
FIG. 6 is timing diagram illustrating an exemplary timing of the start and stop of dispatch of a graphics application and a non-graphics application to the processor in FIG. 4, and the power management circuit issuing commands to adjust the operating point of the processor in response.

FIG. 6 is a timing diagram 600 illustrating an exemplary timing of the start and stop of dispatch of a graphics and a non-graphics application to the processor 108 in FIG. 4, and the power management circuit 406 issuing commands to adjust the operating point of the processor 108 in response. For example, the command processor 200 in the CPU 404 in FIG. 4 could be configured to issue start and stop commands as part of the command 400 issued to the power management circuit 406 to signify the start and stop of dispatch of an application for execution to the processor 108. For example, as shown in FIG. 6, a start command 602 is shown as being issued by the command processor 200 at time t0 to signify the start of a non-graphics application 604 dispatched to the processor 108 for execution in this example. In response to the start command 602 at time t0, the power management circuit 406 is configured to adjust the operating point to a higher operating point in this example to increase performance, because the non-graphics application 604 is less power intensive and results in less current draw from the PMIC 208. There is a latency associated with receipt of the start command 602 and the power management circuit 406 determining a new operating point to set for the processor 108 and the new operating point being adjusted at time t1. The latency is the difference between time t0 and time t1. The latency may be up to fifty (50) microseconds (μs) as an example. Thus, in this example, the non-graphics application 604 will execute at a higher operating point between time t1 when the operating point is adjusted and time t2 when the power management circuit 406 receives a stop command 605 for the non-graphics application 604. The non-graphics application 604 will execute at the previous set operating point from time t0 to time t1.

With continuing reference to FIG. 6, in response to the stop command 605 at time t2, the power management circuit 406 is configured to adjust the operating point to a lower operating point in this example for dispatch of a graphics application 606, because the graphics application 606 is more power intensive and results in higher current draw from the PMIC 208. There is a latency associated with receipt of the stop command 605 and the power management circuit 406 determining a new operating point to set for the processor 108 and the new operating point being adjusted at time t3. The latency is the difference between time t2 and time t3. Thus, in this example, the graphics application 606 will execute at a lower operating point between time t3 when the operating point is adjusted and time t4 when the graphics application 606 is finished executing. The graphics application 606 will execute at the previous set operating point from time t2 to time t3.

With reference to the example timing diagram 600 in FIG. 6, because in this example, the processor 108 is going from execution of a less power intensive non-graphics application 604 at time t2 to a more power intensive graphics application 606, it may be desired to configure the power management circuit 406 to adjust the new operating point for the graphics application 606 in stages. For example, it may be desired in this example, where the operating point is lowered due to the graphics application 606 being more power intensive, to first issue the frequency command 228 to cause the clock controller circuit 204 to lower the operating frequency $F_O$ of the clock signal 128 before the power management circuit 406 issues the voltage command 230 to the PMIC 208 to lower the operating voltage $V_{DD}$ of the power signal 206. In this manner, there is less risk of the processor 108 operating at the higher, current operating frequency $F_O$ of the clock signal 128 at a lower operating voltage $V_{DD}$ that can sustain such operating frequency $F_O$ for the processor 108. This may also be desirable, because even the frequency and voltage commands 228, 230 are issued by the power management circuit 406 at or close to the same time, the operating frequency $F_O$ of the clock signal 128 may be adjusted before the PMIC 208 adjusts the operating voltage $V_{DD}$ of the power signal 206 if the clock controller circuit 204 is physically closer to the power management circuit 406. For example, the clock controller circuit 204 may be located on-chip with the power management circuit 406 and processor 108, whereas the PMIC 208 may be located off-chip from the CPU 404.

Note that adjusting the operating frequency $F_O$ before the operating voltage $V_{DD}$ for a new operating point is not required to be performed by the power management circuit 406. Lowering the operating frequency $F_O$ may have a very low latency in the order of nanoseconds. One way to lower the operating frequency $F_O$ is by enabling a clock divider circuit in the clock path. This is a fast method of lowering the operating frequency $F_O$, because of the digital nature of clock division (rather than the analog nature of slewing the frequency of a phase-locked loop (PLL circuit)).

Also, with reference to the example timing diagram 600 in FIG. 6, if the processor 108 goes from execution of the more power intensive graphics application 606 to a less power intensive non-graphics application 604 at time t0, it may be desired to configure the power management circuit 406 to adjust the new operating point for the graphics application 606 in stages as well. For example, it may be desired in this example, where the operating point is increased due to the non-graphics application 604 being less power intensive, to first issue the voltage command 230 to cause the PMIC 208 to increase the operating voltage $V_{DD}$ of the power signal 206 before issuing the frequency command 228 to cause the clock controller circuit 204 to increase the operating frequency $F_O$ of the clock signal 128. In this manner, there is less risk of the processor 108 operating at the new, higher operating frequency $F_O$ of the clock signal 128 without the operating voltage $V_{DD}$ being at a higher voltage level to sustain such higher operating frequency $F_O$. This may also be desirable, because even the frequency and voltage commands 228, 230 are issued by the power management circuit 406 at or close to the same time, the operating frequency $F_O$ of the clock signal 128 may be adjusted before the PMIC 208 adjusts the operating voltage $V_{DD}$ of the power signal 206 if the clock controller circuit 204 is physically closer to the power management circuit 406. Thus, it may be desired to issue the voltage command 230 sufficiently before issuing the frequency command 228 to increase the operating point of the processor 108 to take into account the latency between issuance of the voltage command 230 and the PMIC 208 adjusting the operating voltage $V_{DD}$ to the new higher voltage level.

Figure 7:
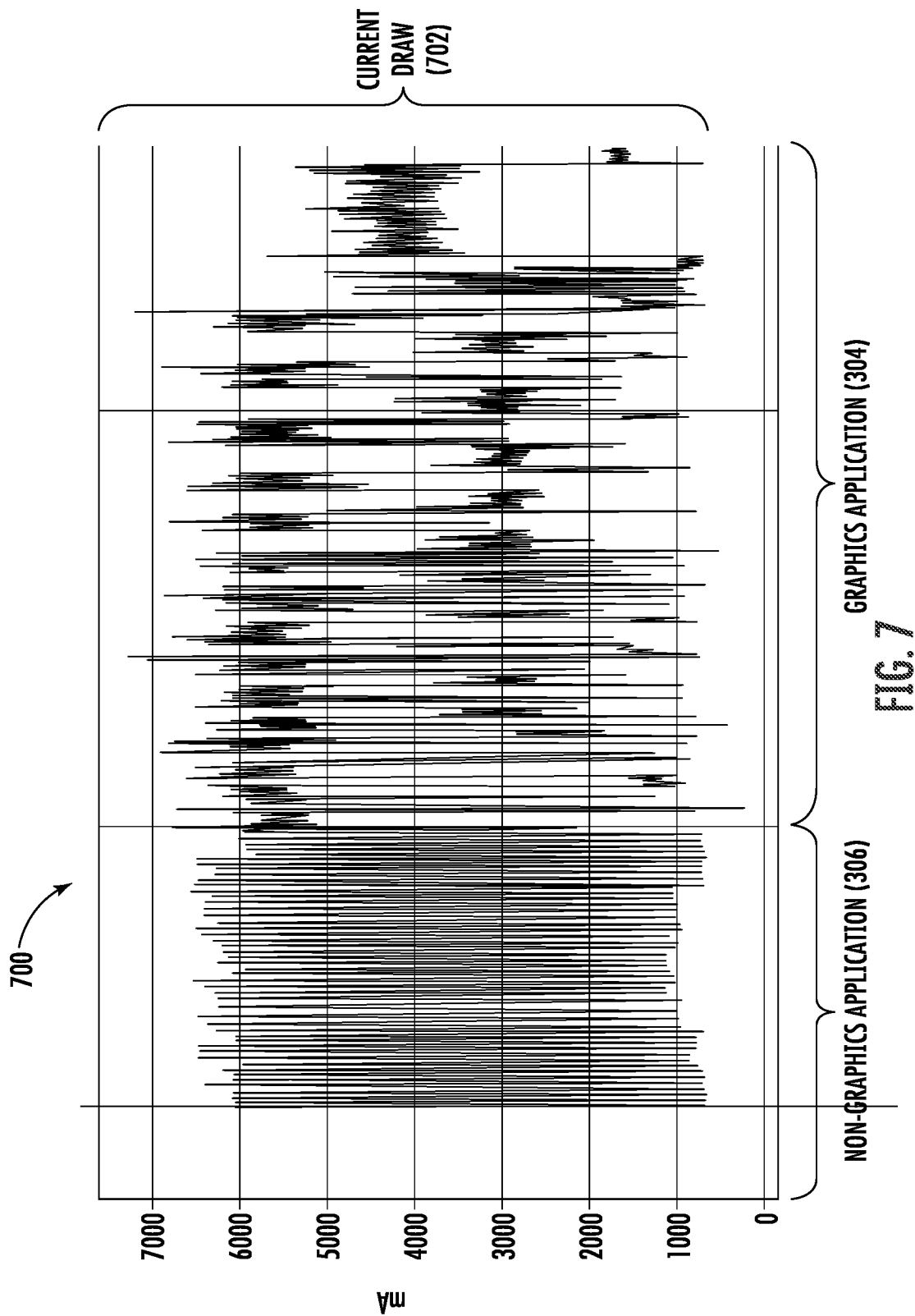
FIG. 7 is a graph illustrating exemplary current draw by the processor in FIG. 4 between a graphics application and a non-graphics application when the power management circuit is configured to set an operating point for the processor based on the identification of a graphics application dispatched for execution by the processor.

FIG. 7 is a graph 700 illustrating exemplary current draw 702 by the processor 108 in FIG. 4 based on the power management circuit 406 set an operating point for the processor 108 based on the identification of a graphics application versus a non-graphics application dispatched for execution. As seen from FIG. 7, and as compared to FIG. 3, the current draw 702 is higher when the processor 108 is executing the non-graphics application 306 than the current draw 302 by the non-graphics application 306 in FIG. 3 executing in the CPU 104 in FIG. 2. The power management circuit 106 is not adjusting the operating point of the CPU 104 in FIG. 2 based on identification of a graphics application. As shown in FIG. 7, the power management circuit 406 in the CPU 404 in FIG. 4 can set the operating point for the non-graphics application 306 based on the current draw 702 of the non-graphics application 306 instead of the more power intensive graphics application 304 while avoiding exceeding the current draw limits of the PMIC 208.

As another example, a power management circuit of a computer processing unit can be configured to identify a particular image rendering pass to be or being executed by the processor within a graphics application and adjust the operating point for the processor based on the identified image rendering pass. An image rendering pass is the flow of data through a computer processing unit pipeline, such as a pipeline in the CPU 404 in FIG. 4 in this example, so that the data gets computed to be consumed for the next stage of rendering an image. For example, a bin visibility pass of a graphics application may involve less processing and thus cause a processor to draw less current than when the processor is executing the rendering pass and/or the resolve pass of a graphics application. The power management circuit can be configured to set the operating point for the processor higher for during execution of the bin visibility pass than during execution of the rendering pass and the resolve pass without risking exceeding current limits of the power supply. This allows the processor to operate at a more optimal operating point for performance for each of the image rendering passes as opposed to certain image rendering passes having to operate at a lower operating point due to other image rendering passes having to operate at such lower operating point to avoid exceeding current draw limits.

Figure 8:
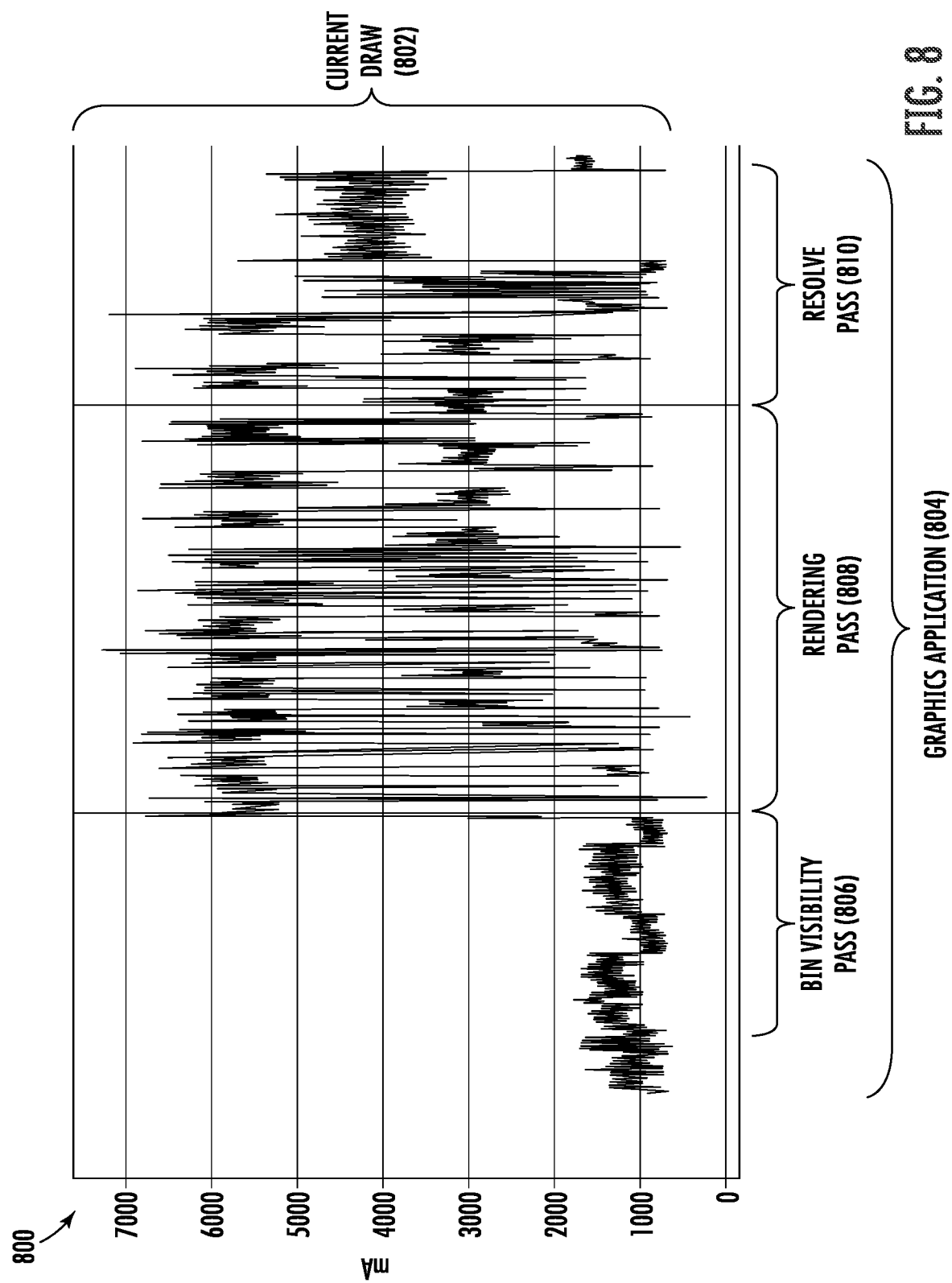
FIG. 8 is a graph illustrating exemplary current draw by a processor in FIG. 4 over different image rendering passes to subdivide an image being drawn into a number of smaller bins that are rendered and copied to memory for output to a display.

FIG. 8 is a graph 800 illustrating exemplary current draw 802 by the GPU when executing an exemplary graphics application 804 that includes different image rendering passes based on an operating point set by a power management circuit according to a DCVS algorithm. The GPU could be the CPU 104 in FIGS. 1 and 2 as an example. For example, the image rendering passes of the graphics application 804 shown as being executed in FIG. 8 are a bin visibility pass 806, a rendering pass 808, and a resolve pass 810. As a non-limiting example, execution of the bin visibility pass 806 determines which triangles contribute fragments to each of the bins or tiles. The result of the bin visibility pass 806 is a visibility stream that contains a bit for each triangle that was checked, indicating whether the triangle was visible in a given bin. The visibility stream is typically compressed and written into the system memory. As another example, execution of the rendering pass 808 draws the portion of the image located inside the bin for each bin. Triangles that are not culled by the visibility stream check are rendered in the rendering pass 808. As another example, actual pixel rasterization and shading is done by executing the rendering pass 808. As another example, execution of the resolve pass 810 performs a resolve pass 810 for each bin to copy the portion of the image contained in the current bin out to the system memory. After the rendering of a bin is complete, color content of the rendered bin is resolved into the system memory before proceeding to the next bin.

As seen in the graph 800 in FIG. 8, the current draw 802 is much higher on a processor executing the bin visibility pass 806 in this example than when executing the rendering pass 808 and resolve pass 810. A power management circuit can set a specific operating point for operating of a GPU executing a graphics application based on the higher operational intensity passes that have a higher current demand like the rendering pass 808 and resolve pass 810 so that the current draw of a power supply supplying an operating voltage $V_{DD}$ will not be exceeded and to avoid a voltage droop. However, this means that the operating point for the GPU results in a lower current draw for the bin visibility pass 806 in this example being a less operationally intensive application as shown in FIG. 8. In other words, the operating point for the GPU is lower during execution of the bin visibility pass 806 than it could be and still does not risk exceeding current draw limits of a power supply for the GPU. This creates performance degradation of the GPU when executing bin visibility pass 806.

Figure 9:
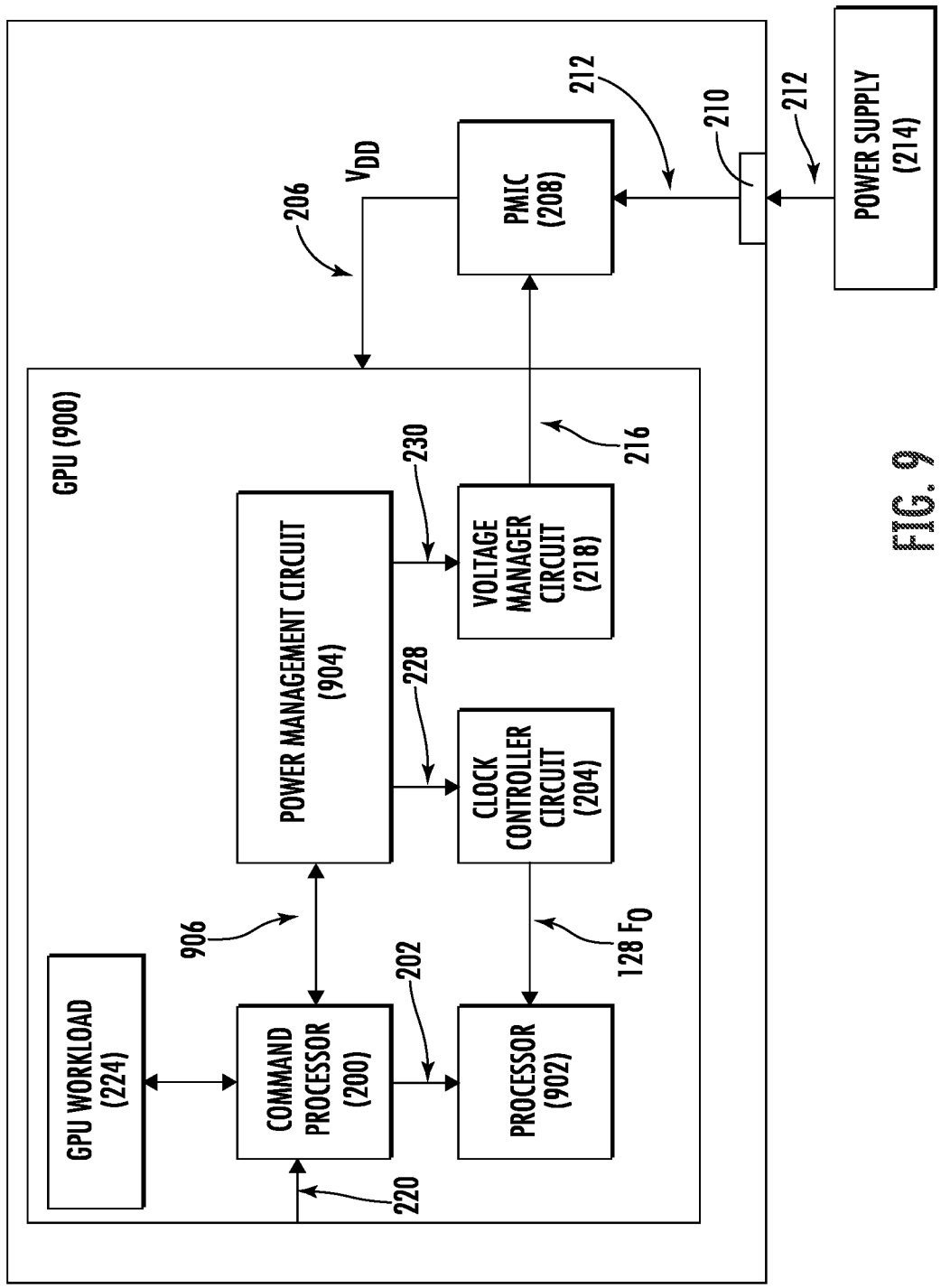
FIG. 9 is a schematic diagram of an exemplary computer system that includes a graphics processing unit (GPU) that includes a GPU processor and a power management circuit configured to set an operating point for the GPU processor based on the identification of an image rendering pass dispatched to the GPU processor, and a power management integrated circuit (IC) (PMIC) configured to generate the operating voltage for the GPU processor based on the set operating point.

FIG. 9 is a schematic diagram of an exemplary GPU 900 that includes a GPU processor 902 referred to as "processor 902" and power management circuit 904. The power management circuit 904 is configured to set an operating point (i.e., frequency and/or voltage) to control the operating frequency and/or operating voltage used for operation of the processor 902 based on the identification of an image rendering pass dispatched to the processor 902 dispatched for execution. This allows the operating point for the GPU 900 to be changed based on the type of image rendering pass dispatched for execution to the processor 902 based on the knowledge that different image rendering passes involve different processing intensities and current draws. Using the example in FIG. 8, this means that an operating point for the GPU 900 could be increased when executing the bin visibility pass 806 and not risk exceeding current draw limits of a power supply 214 supplying to the GPU 900. But then when the rendering and/or resolve passes 808, 810 are dispatched to be executed, the power management circuit 904 can adjust the operating point for the GPU 900 lower to not risk exceeding current draw of the power supply 214. Common components between the CPU 404 in FIG. 4 and the GPU 900 in FIG. 4 are shown with the same element numbers between FIGS. 4 and 9 and are not re-described.

Figure 10:
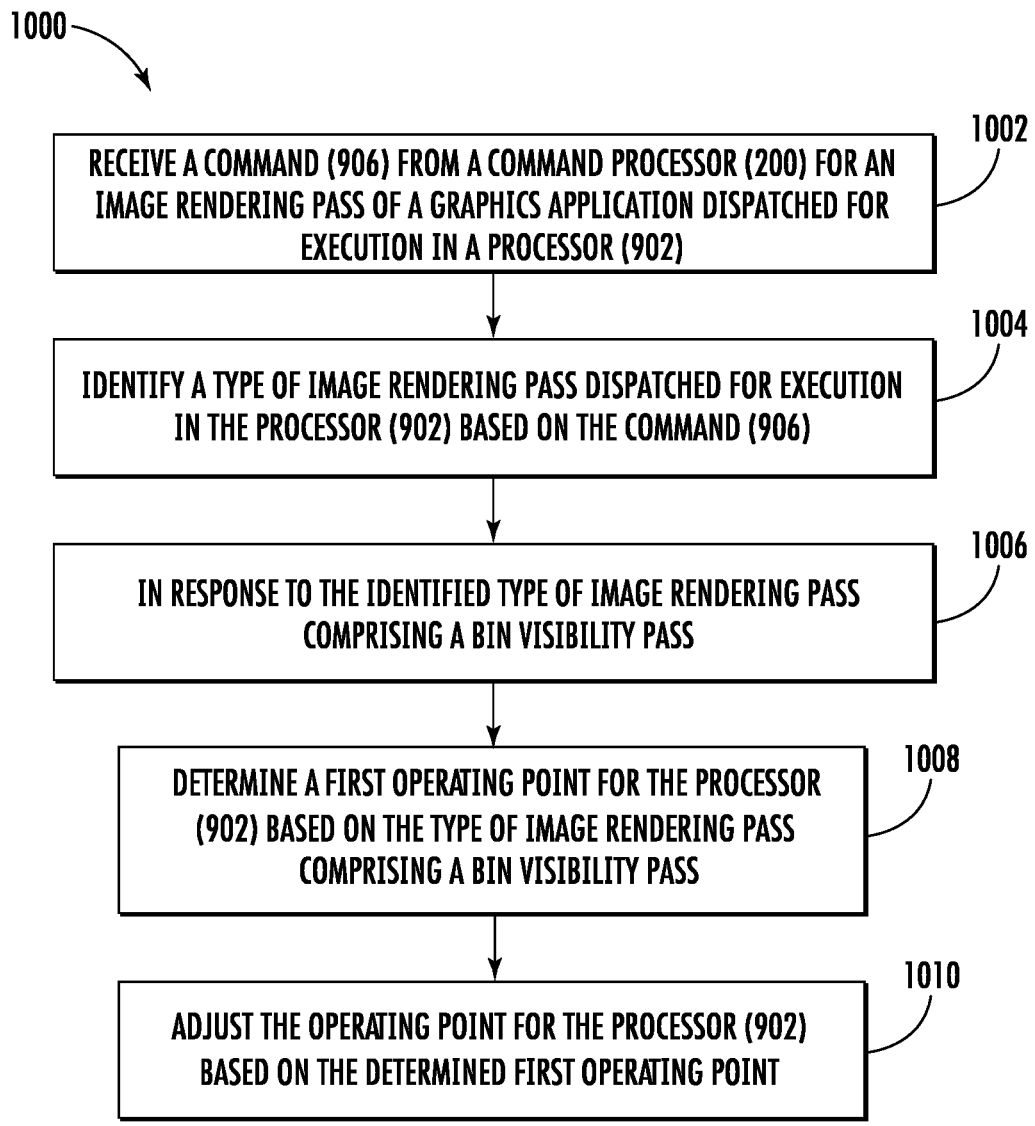
FIG. 10 is timing diagram illustrating an exemplary timing of the start and stop of dispatch of identified image rendering passes by the GPU processor to the power management circuit in FIG. 9, and the power management circuit issuing commands to adjust the operating point for the GPU processor in response.

With reference to FIG. 9, the operation of the GPU 900 and the power management circuit 904 for setting an operating point for the processor 902 based on the identification of an image rendering pass dispatched for execution by the processor 902 is discussed in conjunction with the flowchart in FIG. 10. In this regard, the power management circuit 406 is configured to receive a command 906 from the command processor 200 in this example for an image rendering pass for a graphics application dispatched for execution in the processor 902 (block 1002 in FIG. 10). The power management circuit 904 is configured to identify the type of image rendering pass dispatched for execution in the processor 902 based on the command 906 received from the command processor 200 (block 1004 in FIG. 10). If the type of image rendering pass dispatched for execution in the processor 902 is a bin visibility pass (block 1006 in FIG. 10), the power management circuit 406 is configured to determine a first operating point for the processor 902 based on the bin visibility pass being dispatched for execution to the processor 902 (block 1008 in FIG. 10). The power management circuit 904 is then configured to adjust the operating point for the processor 902 based on the determined first operating point (block 1010 in FIG. 10).

Note that the command processor 200 in the GPU 900 in FIG. 9 can be configured to issue the command 906 directly or indirectly to the power management circuit 904. For example, the command processor 200 could send an IPC message for the command 906 to the power management circuit 904. Alternatively, the command processor 200 could use an interrupt to communicate the command 906 to the power management circuit 904. The command processor 200 could be configured to store a message with the command 906 to a designated memory location in memory, like the system memory 126 in FIG. 1, and then generate an interrupt for the power management circuit 904. The power management circuit 904 could then be configured to consult the designated memory location in response to the interrupt as part of its interrupt handling to retrieve the information in the command 906 to use to determine if the operating point is to be adjusted.

In this example of DCVS, the power management circuit 904 in the GPU 900 in FIG. 9 is configured to adjust the operating point by issuing the frequency command 228 to the clock controller circuit 204 indicating the desired operating frequency $F_O$ of the determined operating point. The power management circuit 904 is also configured to issue the voltage command 230 to the voltage manager circuit 218 to indicate the desired operating voltage $V_{DD}$ of the determined first operating point. If the type of application dispatched for execution in the processor 902 is not the bin visibility pass of a graphics application, the power management circuit 904 is configured to determine a second operating point for the processor 902 based an image rendering pass of the graphics application that is not the bin visibility pass being dispatched for execution to the processor 902. The power management circuit 904 is then configured to adjust the operating point for the processor 902 based on the determined second operating point.

The power management circuit 904 in the GPU 900 in FIG. 9 could be configured to set a plurality of different operating points for both a bin visibility pass and non-bin visibility passes rather than just one operating point. The power management circuit 904 can be configured set a first operating point for a non-bin visibility pass lower than the second operating point for a bin visibility pass, or vice versa. For example, the power management circuit 904 can be configured to set an operating point for a bin visibility pass for a higher operating frequency $F_O$ and/or higher operating voltage $V_{DD}$ than for a non-bin visibility pass. Alternatively, the power management circuit 904 could be configured to set an operating point for a non-bin visibility pass for a higher operating frequency $F_O$ and/or higher operating voltage $V_{DD}$ than for a bin visibility pass if the bin visibility pass is more processing intensive and has a higher current draw than a non-bin visibility pass as an example.

Note that the power management circuit 904 in the GPU 900 in FIG. 9 could alternatively be configured to implement DFS where only the operating frequency $F_O$ of the clock signal 128 is adjusted. Also note that the power management circuit 904 could alternatively be configured to implement DVS where only the operating voltage $V_{DD}$ of the power signal 206 is adjusted. Also note that the power management circuit 904 could be configured to adjust the operating voltage $V_{DD}$ as part of an increase to the operating point of the GPU 900 gradually to allow the PMIC 208 to regulate the operating voltage $V_{DD}$ of the power signal 206 over time to avoid voltage spikes that can cause in-rush currents due to spikes in current demand. In this regard, the power management circuit 904 could be configured to first adjust the operating voltage $V_{DD}$ of the power signal 206 in response to a voltage command 230 to a first operating voltage $V_{DD}$ and then after a certain period of time, further adjust the operating voltage $V_{DD}$ of the power signal 206 in response to a voltage command 230 to a second or final operating voltage $V_{DD}$ according to the determined operating point.

Figure 11:
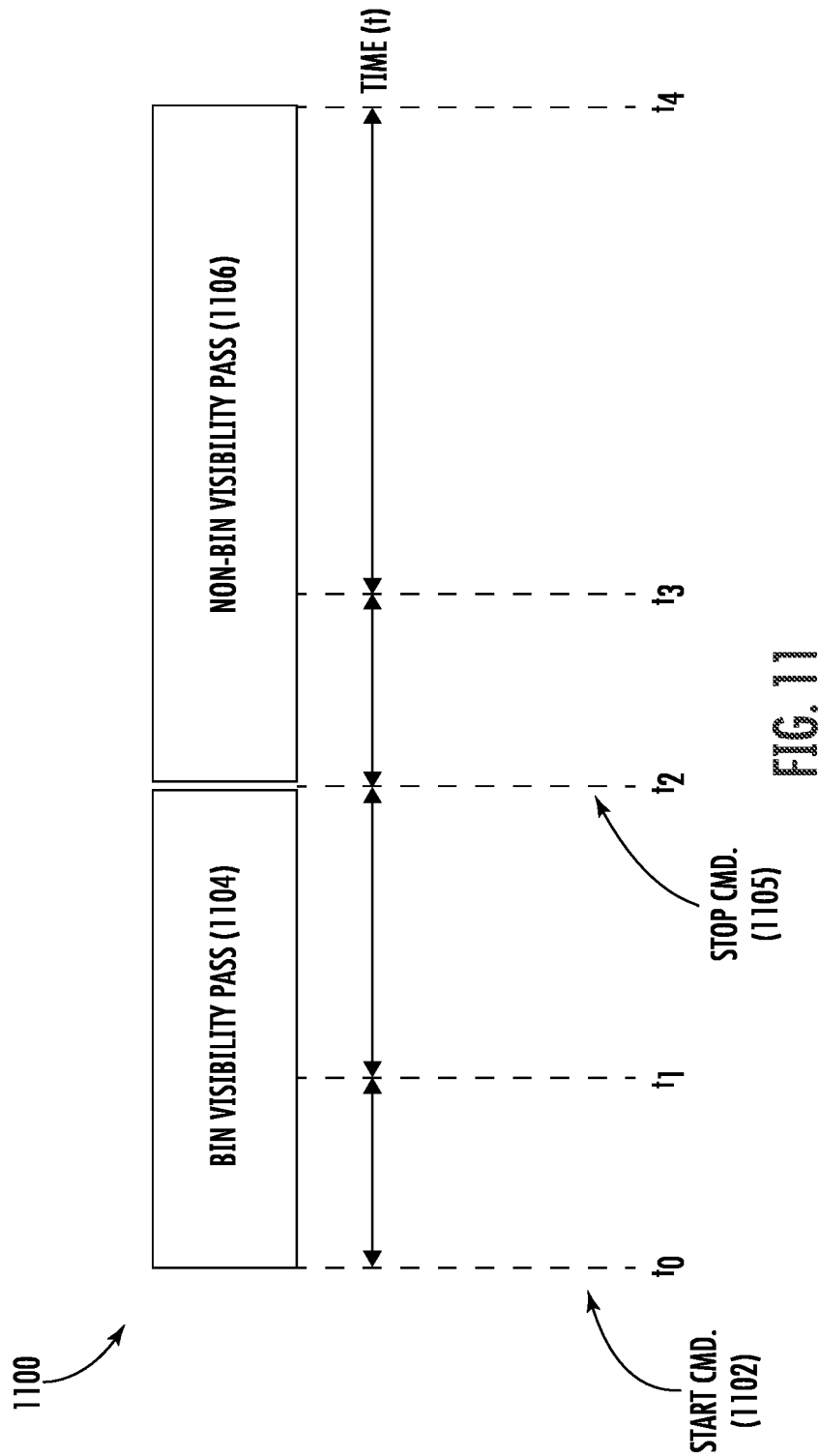
FIG. 11 is a flowchart illustrating an exemplary process of the power management circuit in FIG. 9 setting an operating point for the GPU processor based on the identification of an image rendering pass to be executed or being executed by the GPU processor.

FIG. 11 is a timing diagram 1100 illustrating an exemplary timing of the start and stop of dispatch of a bin visibility pass to the processor 902 in FIG. 9, and the power management circuit 904 issuing commands to adjust the operating point of the processor 902 in response. For example, the command processor 200 in the GPU 900 in FIG. 9 could be configured to issue start and stop commands as part of the command 906 issued to the power management circuit 904 to signify the start and stop of dispatch of image rendering passes for execution to the processor 902. For example, as shown in FIG. 11, a start command 1102 is shown as being issued by the command processor 200 at time t0 to signify the start of a bin visibility pass 1104 dispatched to the processor 902 for execution. In response to the start command 1102 at time t0, the power management circuit 904 is configured to adjust the operating point of the GPU 900 to a higher operating point in this example to increase performance, because the bin visibility pass 1104 is less power intensive and results in less current draw from the PMIC 208 in this example. There is a latency associated with receipt of the start command 1102 and the power management circuit 904 determining a new operating point to set for the processor 902 and the new operating point being adjusted at time t1. The latency is the difference between time t0 and time t1. The latency may be up to fifty (50) microseconds (μs) as an example. Thus, in this example, the bin visibility pass 1104 will execute at a higher operating point between time t1 when the operating point is adjusted and time t2 when the power management circuit 904 receives a stop command 1105 for the non-graphics application. The bin visibility pass 1104 will execute at the previous set operating point from time t0 to time t1.

With continuing reference to FIG. 11, in response to the stop command 1105 at time t2, the power management circuit 904 is configured to adjust the operating point to a lower operating point in this example for dispatch of a non-bin visibility pass 1106, because the non-bin visibility pass 1106 is more power intensive and results in higher current draw from the PMIC 208. There is a latency associated with receipt of the stop command 1105 and the power management circuit 904 determining a new operating point to set for the processor 902 and the new operating point being adjusted at time t3. The latency is the difference between time t2 and time t3. Thus, in this example, the non-bin visibility pass 1106 will execute at a lower operating point between time t3 when the operating point is adjusted and time t4 when the non-bin visibility pass 1106 is finished executing. The non-bin visibility pass 1106 will execute at the previous set operating point from time t2 to time t3.

With reference to the example timing diagram 1100 in FIG. 11, because in this example, the processor 902 is going from execution of a less power intensive bin visibility pass 1104 at time t2 to a more power intensive non-bin visibility pass 1106, it may be desired to configure the power management circuit 904 to adjust the new operating point for the non-bin visibility pass 1106 in stages. For example, it may be desired in this example, where the operating point is lowered due to the non-bin visibility pass 1106 being more power intensive, to first issue the frequency command 228 to cause the clock controller circuit 204 to lower the operating frequency $F_O$ of the clock signal 128 before the power management circuit 904 issues the voltage command 230 to cause the PMIC 208 to lower the operating voltage $V_{DD}$ of the power signal 206. In this manner, there is less risk of the processor 902 operating at the higher, current operating frequency $F_O$ of the clock signal 128 at a lower operating voltage $V_{DD}$ that can sustain such operating frequency $F_O$ for the processor 902. This may also be desirable, because as the frequency and voltage commands 228, 230 are issued by the power management circuit 904 at or close to the same time, the operating frequency $F_O$ of the clock signal 128 may be adjusted before the PMIC 208 adjusts the operating voltage $V_{DD}$ of the power signal 206 if the clock controller circuit 204 is physically closer to the power management circuit 904. For example, the clock controller circuit 204 may be located on-chip with the power management circuit 904 and processor 902, whereas the PMIC 208 may be located off-chip from the GPU 900. However, adjusting of the operating frequency $F_O$ before the operating voltage $V_{DD}$ for a new operating point is not required to be performed by the power management circuit 904.

Also, with reference to the example timing diagram 1100 in FIG. 11, if the processor 902 goes from execution of the more power intensive non-bin visibility pass 1106 to a less power intensive bin visibility pass 1104 at time t0, it may be desired to configure the power management circuit 904 to adjust the new operating point for the non-bin visibility pass 1106 in stages as well. For example, it may be desired in this example, where the operating point is increased due to the bin visibility pass 1104 being less power intensive, to first issue the voltage command 230 to cause the PMIC 208 to increase the operating voltage $V_{DD}$ of the power signal 206 before issuing the frequency command 228 to cause the clock controller circuit 204 to increase the operating frequency $F_O$ of the clock signal 128. In this manner, there is less risk of the processor 902 operating at the new, higher operating frequency $F_O$ of the clock signal 128 without the operating voltage $V_{DD}$ being at a higher voltage level to sustain such higher operating frequency $F_O$. This may also be desirable, because as the frequency and voltage commands 228, 230 are issued by the power management circuit 406 at or close to the same time, the operating frequency $F_O$ of the clock signal 128 may be adjusted before the PMIC 208 adjusts the operating voltage $V_{DD}$ of the power signal 206 if the clock controller circuit 204 is physically closer to the power management circuit 904. Thus, it may be desired to issue the voltage command 230 sufficiently before issuing the frequency command 228 to increase the operating point of the processor 902 to take into account the latency between issuance of the voltage command 230 and the PMIC 208 adjusting the operating voltage $V_{DD}$ to the new higher voltage level.

Figure 12:
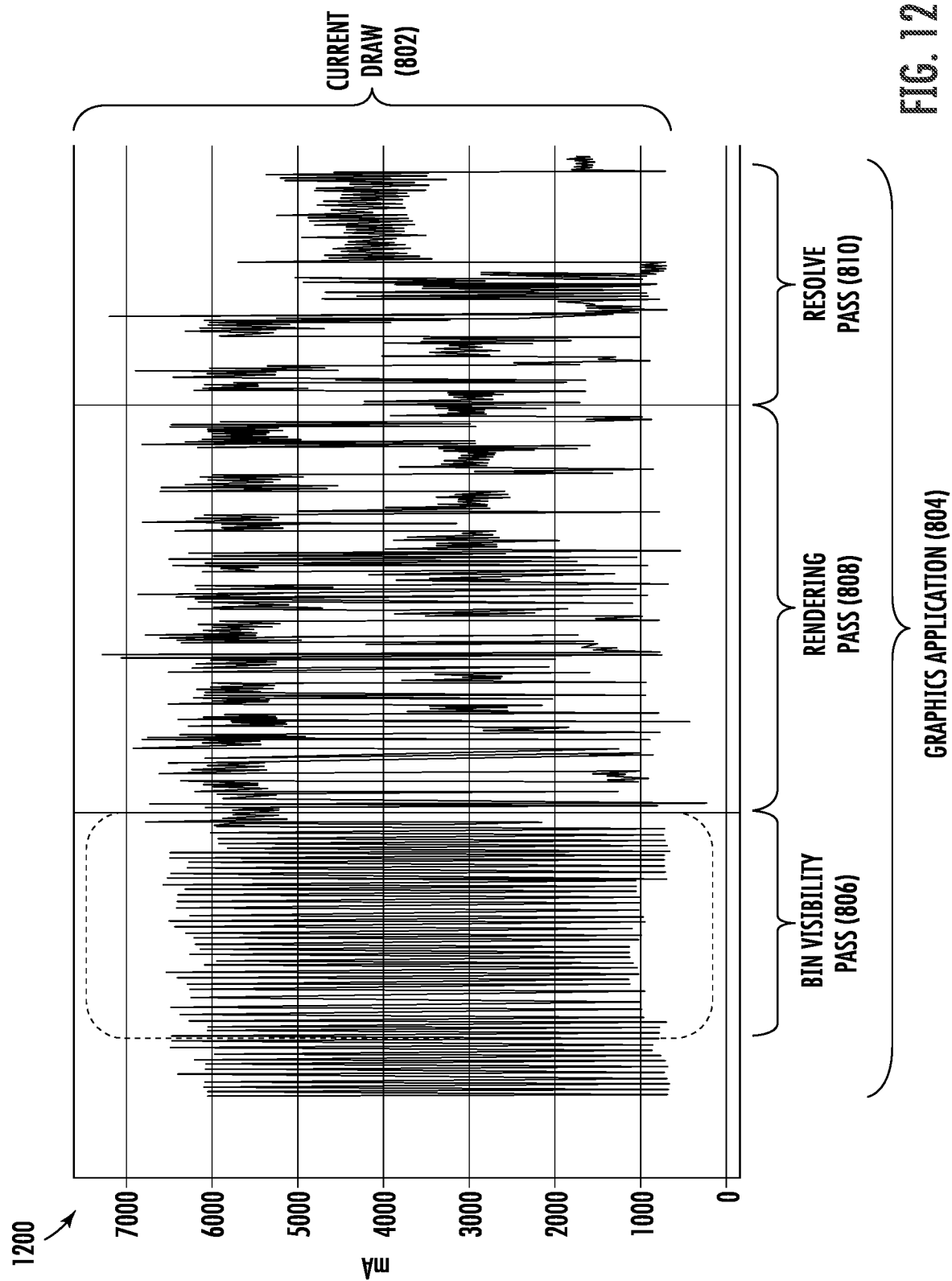
FIG. 12 is a graph illustrating exemplary current draw by the GPU processor in FIG. 9 over different image rendering passes to subdivide an image being drawn into a number of smaller bins that are rendered and copied to memory for output to a display when the power management circuit is configured to set an operating point for the GPU processor based on the identification of an image rendering pass to be executed or being executed by the GPU processor.

FIG. 12 is a graph 1200 illustrating exemplary current draw by the processor 902 in FIG. 9 based on the power management circuit 904 set an operating point for the processor 902 based on the identification of an image rendering pass dispatched for execution. As seen from FIG. 12, and as compared to FIG. 8, the current draw 802 is higher when the processor 902 is executing the bin visibility pass 806 than the current draw 802 by execution of the non-bin visibility passes of the rendering pass 808 and resolve pass 810 where the power management circuit is not adjusting the operating point based on identification of an image rendering pass. As shown in FIG. 12, the power management circuit 904 in the GPU 900 in FIG. 9 can set the operating point for the bin visibility pass 806 based on the current draw 802 of the bin visibility pass 806 instead of the more power intensive non-bin visibility passes (e.g., rendering pass 808 and resolve pass 810) while avoiding exceeding the current draw limits of the PMIC 208.

A central processing unit that includes a processor and power management circuit configured to set an operating point (i.e., frequency and/or voltage) to control the operating frequency and operating voltage used for operation of the processor, based on identifying of a graphics application dispatched for execution by the processor may be provided in or integrated into any processor-based device. Examples, without limitation, include a head-mounted display, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD1 player, a portable digital video player, an automobile, a vehicle component, avionics systems, a drone, and a multicopter.

Figure 13:
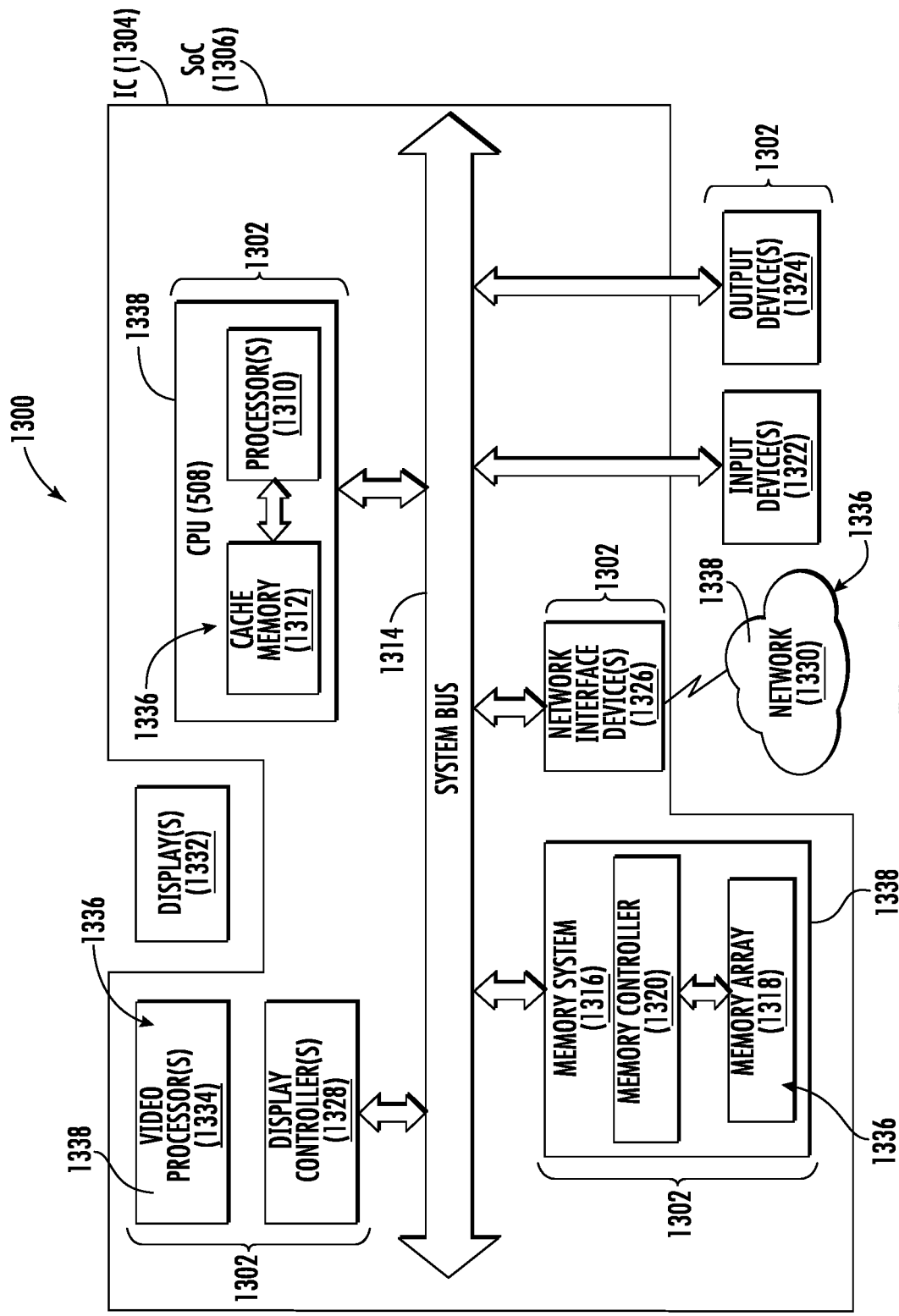
FIG. 13 is a block diagram of an exemplary processor-based system that includes a processor and a power management circuit configured to set a frequency and voltage operating point for the processor based on the identification, including, but not limited to the power management circuits in FIGS. 4 and 9.

In this regard, FIG. 13 illustrates an example of a processor-based system 1300 that can include a CPU or GPU 1302 including a processor and power management circuit configured to set an operating point (i.e., frequency and/or voltage) to control the operating frequency and operating voltage used for operation of the processor, based on identifying of a graphics application dispatched for execution by the processor including, but not limited to, the CPU 404 in FIG. 4 and GPU 900 in FIG. 9, as non-limiting examples. In this example, the processor-based system 1300 is provided in an IC 1304. The IC 1304 may be included in or provided as a system on a chip (SoC) 1306. The processor-based system 1300 includes a CPU 1308 that includes one or more processors 1310. The CPU 1308 may include a cache memory 1312 coupled to the processor(s) 1310 for rapid access to temporarily stored data. The CPU 1308 is coupled to a system bus 1314 and can intercouple master and slave devices included in the processor-based system 1300. As is well known, the CPU 1308 communicates with these other devices by exchanging address, control, and data information over the system bus 1314. Although not illustrated in FIG. 13, multiple system buses 1314 could be provided, wherein each system bus 1314 constitutes a different fabric.

For example, the CPU 1308 can communicate bus transaction requests to a memory system 1316 as an example of a slave device. The memory system 1316 may include a memory array 1318 whose access is controlled by a memory controller 1320.

Other master and slave devices can be connected to the system bus 1314. As illustrated in FIG. 13, these devices can include the memory system 1316, and one or more input devices 1322. The input device(s) 1322 can include any type of input device, including, but not limited to, input keys, switches, voice processors, etc. The other devices can also include one or more output devices 1324, and one or more network interface devices 1326 to audio, video, other visual indicators, etc. The other devices can also include one or more display controllers 1328 as examples. The network interface device(s) 1326 can be any device(s) configured to allow exchange of data to and from a network 1330. The network 1330 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1326 can be configured to support any type of communications protocol desired.

The CPU 1308 may also be configured to access the display controller(s) 1328 over the system bus 1314 to control information sent to one or more displays 1332. The display controller(s) 1328 sends information to the display(s) 1332 to be displayed via one or more video processors 1334, which process the information to be displayed into a format suitable for the display(s) 1332. The display(s) 1332 can include any type of display, including, but not limited to, a cathode ray tube (CRT), a liquid crystal display (LCD), a plasma display, etc.

The processor-based system 1300 in FIG. 13 may include a set of instructions 1336 to set an operating point (i.e., frequency and/or voltage) to control the operating frequency and operating voltage used for operation of the processor (e.g., processor(s) 1310 or video processor(s) 1334), based on identifying of a graphics application dispatched for execution by the processor. The instructions 1336 may be stored in the memory array 1318 of the memory system 1316, the CPU 1308, the video processor(s) 1334, and the network 1330 as examples of non-transitory computer-readable medium 1338.

While the computer-readable medium 1338 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" can also include any medium that is capable of storing, encoding, or carrying a set of instructions for execution by the processing device and that cause the processing device to perform any one or more of the methodologies of the embodiments disclosed herein. The term "computer-readable medium" includes, but is not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design states imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A computer system comprising a graphics processing unit (GPU), the GPU comprising:
a processor configured to:
execute graphics rendering commands for a bin visibility pass and a non-bin-visibility pass; and
operate at an operating point corresponding to an operating voltage and an operating frequency; and
a power management circuit configured to:
in response to the executed graphics rendering commands:
control the operating point of the processor;
set a bin-visibilty operating point for the bin visibility pass that is different from an operating point for the non-bin-visibility pass;
identify the graphics rendering command as a command for the bin visibility pass;
adjust the operating point of the processor to the bin-visibility operating point in response to the identification;
subsequently identify a graphics rendering command as a command for a non-bin-visibilty pass; and
adjust the operating point of the processor to the non-bin-visibility pass in response to the subsequent identification.

2. The computer system of claim 1, wherein the non-bin-visibility pass comprises at least one of a rendering pass and a resolve pass.

3. The computer system of claim 1, wherein the bin-visibility point is higher than the non-bin-visibility operating point.

4. The computer system of claim 1, wherein the power management circuit is configured to adjust the operating point of the processor in stages, first adjusting the operating frequency and then adjusting the operating voltage.

5. The computer system of claim 1, wherein the computer system is one of: a head-mounted display, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

6. The computer system of claim 3, wherein the operating frequency corresponding to the bin-visibility operating point is higher than the operating frequency corresponding to the non-bin-visibility operating point.

7. The computer system of claim 3, wherein the operating voltage corresponding to the bin-visibility operating point is higher than the operating voltage corresponding to the non-bin-visibility operating point.

8. The computer system of claim 3, wherein:
the operating frequency corresponding to the bin-visibility operating point is higher than the operating frequency corresponding to the non-bin-visibility operating point; and
the operating voltage corresponding to the bin-visibility operating point is higher than the operating voltage corresponding to the non-bin-visibility operating point.

9. A computer-implemented method for a system comprising a graphics processing unit (GPU), the method comprising:
executing, by a processor, graphics rendering commands for a bin visibility pass and a non-bin-visibility pass;
operating, by the processor, at an operating point corresponding to an operating voltage and an operating frequency;
in response to the executed graphics rendering commands:
controlling, by a power management circuit, the operating point of the processor; setting, by the power management circuit, a bin-visibilty operating point for the bin visibility pass that is different from an operating point for the non-bin-visibility pass;
identifying, by the power managemement circuit, the graphics rendering command as a command for the bin visibility pass;
adjusting, by the power managemement circuit, the operating point of the processor to the bin-visibility operating point in response to the identification;
subsequently, by the power managemement circuit, identifying a graphics rendering command as a command for a non-bin-visibilty pass; and
adjusting, by the power managemement circuit, the operating point of the processor to the non-bin-visibility pass in response to the subsequent identification.

10. The method of claim 9, wherein the non-bin-visibility pass comprises at least one of a rendering pass and a resolve pass.

11. The method of claim 9, wherein the bin-visibility point is higher than the non-bin-visibility operating point.

12. The method of claim 9, comprising adjusting the operating point of the processor in stages, first adjusting the operating frequency and then adjusting the operating voltage.

13. The method of claim 11, wherein the operating frequency corresponding to the bin-visibility operating point is higher than the operating frequency corresponding to the non-bin-visibility operating point.

14. The method of claim 11, wherein the operating voltage corresponding to the bin-visibility operating point is higher than the operating voltage corresponding to the non-bin-visibility operating point.

15. The method of claim 11, wherein:
the operating frequency corresponding to the bin-visibility operating point is higher than the operating frequency corresponding to the non-bin-visibility operating point; and
the operating voltage corresponding to the bin-visibility operating point is higher than the operating voltage corresponding to the non-bin-visibility operating point.

* * * * *